(12) United States Patent
Akiya et al.

(10) Patent No.: US 7,677,629 B2
(45) Date of Patent: Mar. 16, 2010

(54) MOVEMENT DEVICE FOR VEHICLE SEAT

(75) Inventors: Hideki Akiya, Toyota (JP); Tadashi Nie, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 27 days.

(21) Appl. No.: 11/995,174

(22) PCT Filed: Jun. 14, 2006

(86) PCT No.: PCT/JP2006/311940

§ 371 (c)(1),
(2), (4) Date: Apr. 9, 2008

(87) PCT Pub. No.: WO2007/007505

PCT Pub. Date: Jan. 18, 2007

(65) Prior Publication Data
US 2009/0108615 A1    Apr. 30, 2009

(30) Foreign Application Priority Data
Jul. 14, 2005  (JP) .............................. 2005-205475

(51) Int. Cl.
*B60N 2/12* (2006.01)
(52) U.S. Cl. .................. 296/64; 296/65.09; 296/65.11
(58) Field of Classification Search .................. 296/64, 296/65.09, 65.11; 244/118.6; 297/257
See application file for complete search history.

(56) References Cited

U.S. PATENT DOCUMENTS 5,911,465 A    6/1999  Yamamoto et al.

6,457,765 B1    10/2002  Bergquist et al.
7,229,117 B2    6/2007   Okuda et al.
2002/0021016 A1    2/2002  Bergquist et al.

FOREIGN PATENT DOCUMENTS

| JP | 58-026642 | 2/1983 |
|----|-----------|--------|
| JP | 10-203207 | 8/1998 |
| JP | 10-203210 | 8/1998 |
| JP | 11-11196  | 1/1999 |

(Continued)

OTHER PUBLICATIONS

English language Abstract of JP 2002-120604.

(Continued)

*Primary Examiner*—Lori L Lyjak
(74) *Attorney, Agent, or Firm*—Greenblum & Bernstein, P.L.C.

(57) ABSTRACT

A movement device for a vehicle seat includes lower rails extending in a forward or rearward direction of a vehicle are arranged in a vehicle width direction on a vehicle floor. An upper rail provided at a lower part of a seat slidably movably engages with the lower rails. A recess is formed in the vehicle floor, enabling a carriage to be conveyed between the lower rails along the vehicle width direction. The carriage is separated from the vehicle floor, and guide rails are installed on the carriage. The guide rails are provided in extensions of the lower rails so as to be capable of directly accepting a sliding movement of the upper rail from the lower rails, as the upper rail is removed from the lower rail into the extension thereof.

29 Claims, 20 Drawing Sheets

FOREIGN PATENT DOCUMENTS

| | | |
|---|---|---|
| JP | 11-11197 | 1/1999 |
| JP | 11-310063 | 11/1999 |
| JP | 11-310064 | 11/1999 |
| JP | 2002-120604 | 4/2002 |
| JP | 2003-118438 | 4/2003 |
| JP | 2006-032415 | 11/2006 |
| WO | 00/41911 | 7/2000 |

OTHER PUBLICATIONS

English language Abstract of JP 2003-118438.
English language Abstract of JP 58-026642.
English language Abstract of JP 11-310064.
English language Abstract of JP 11-310063.
English language Abstract of JP 10-203207.
English language Abstract of JP 10-203210.
English language Abstract of JP 11-11196.
English language Abstract of JP 11-11197.
English language Abstract of JP 2006-032415.

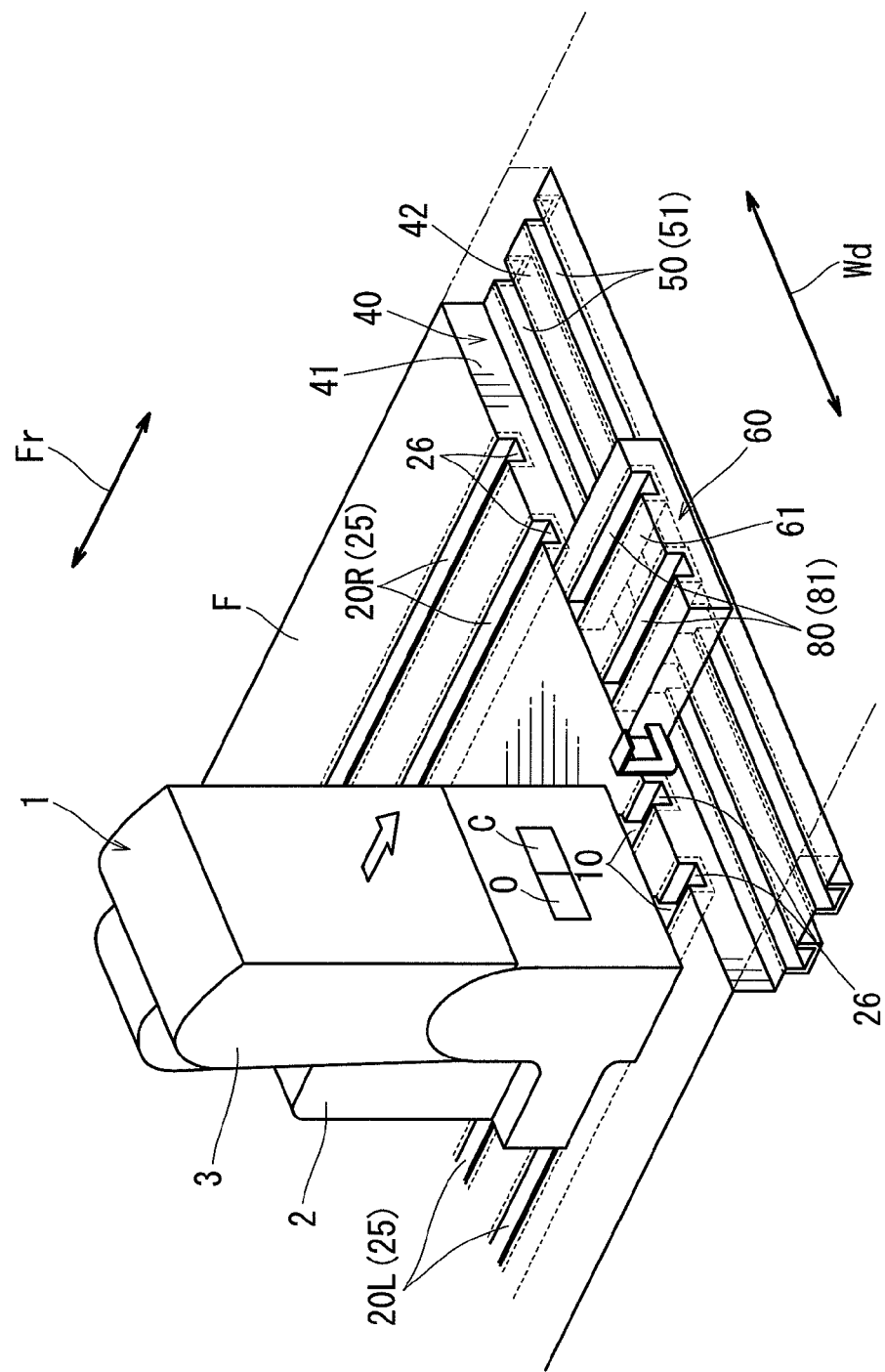
[FIG. 1]

[FIG. 2]
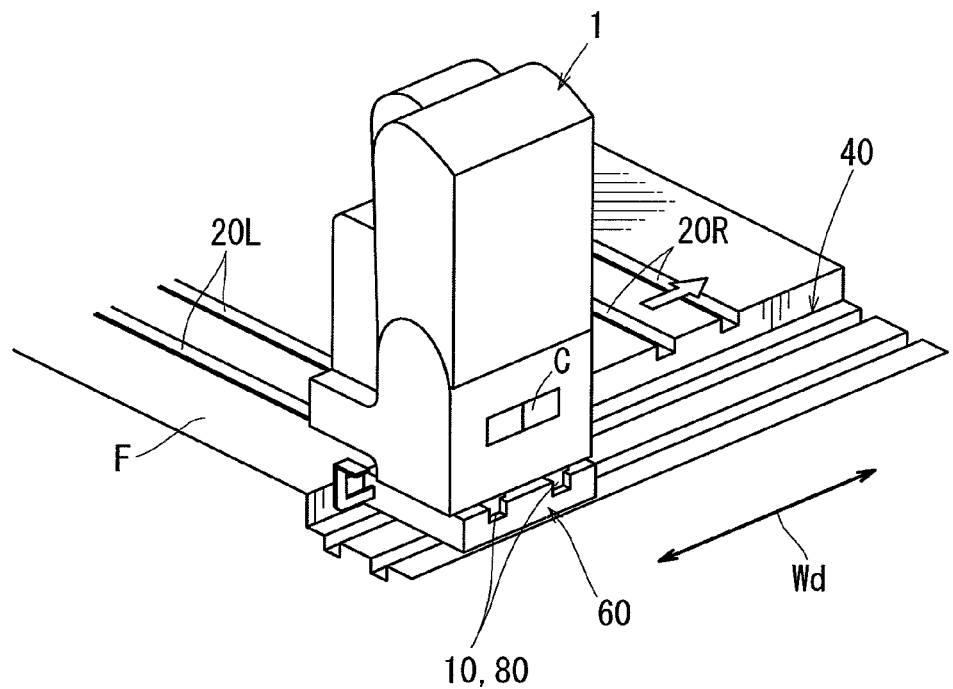
[FIG. 3]
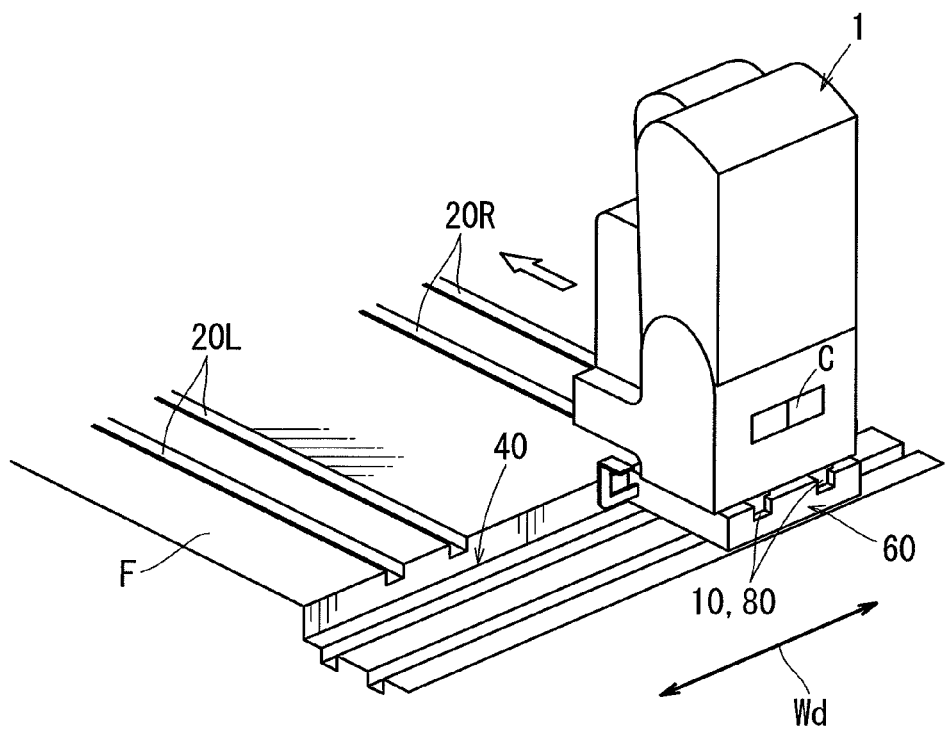

[FIG. 4]
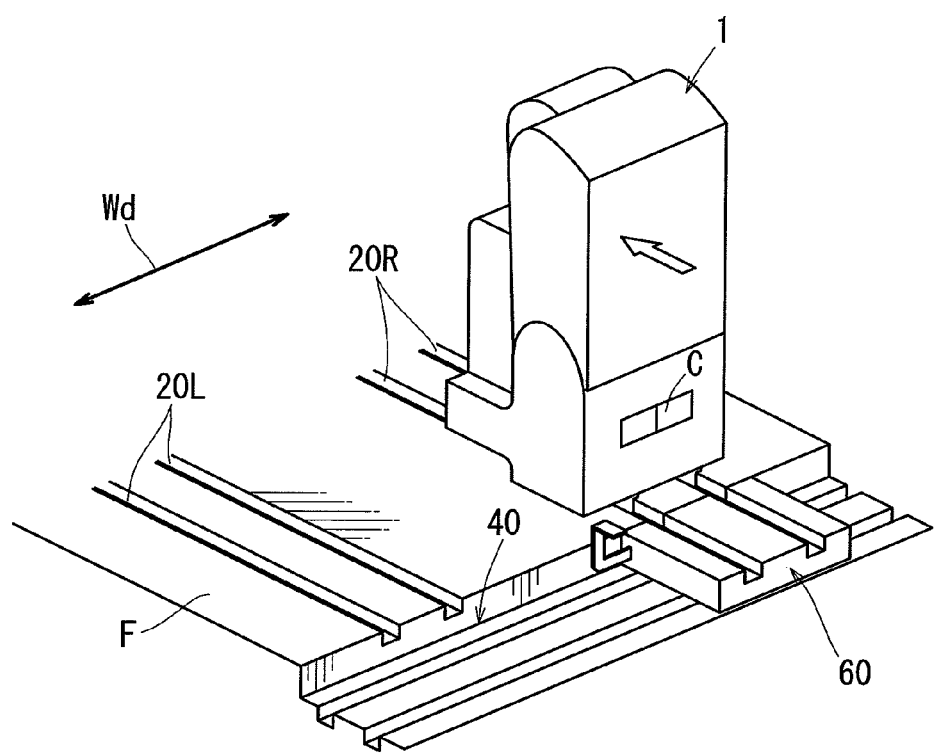

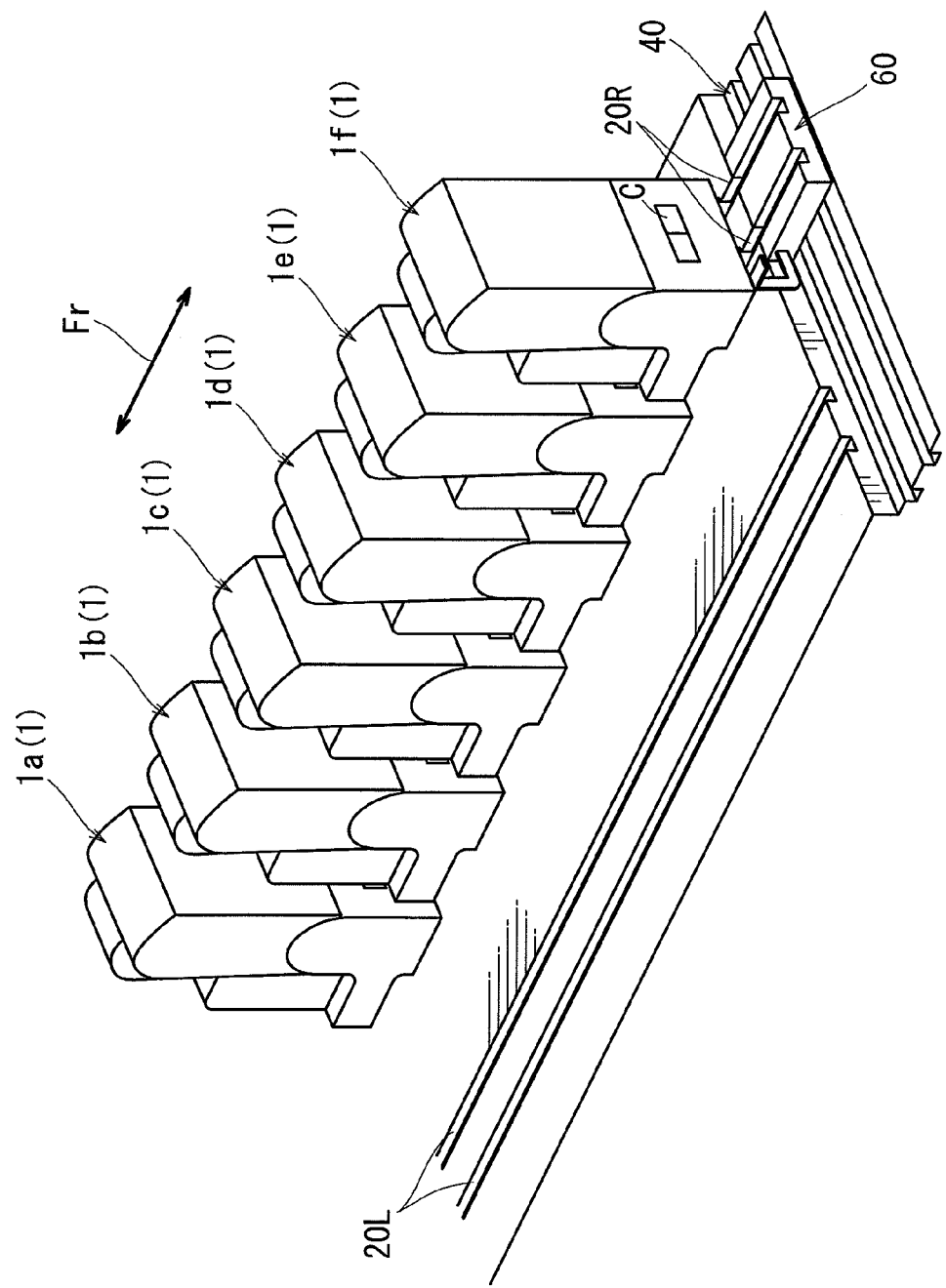
[FIG. 5]

[FIG. 6]
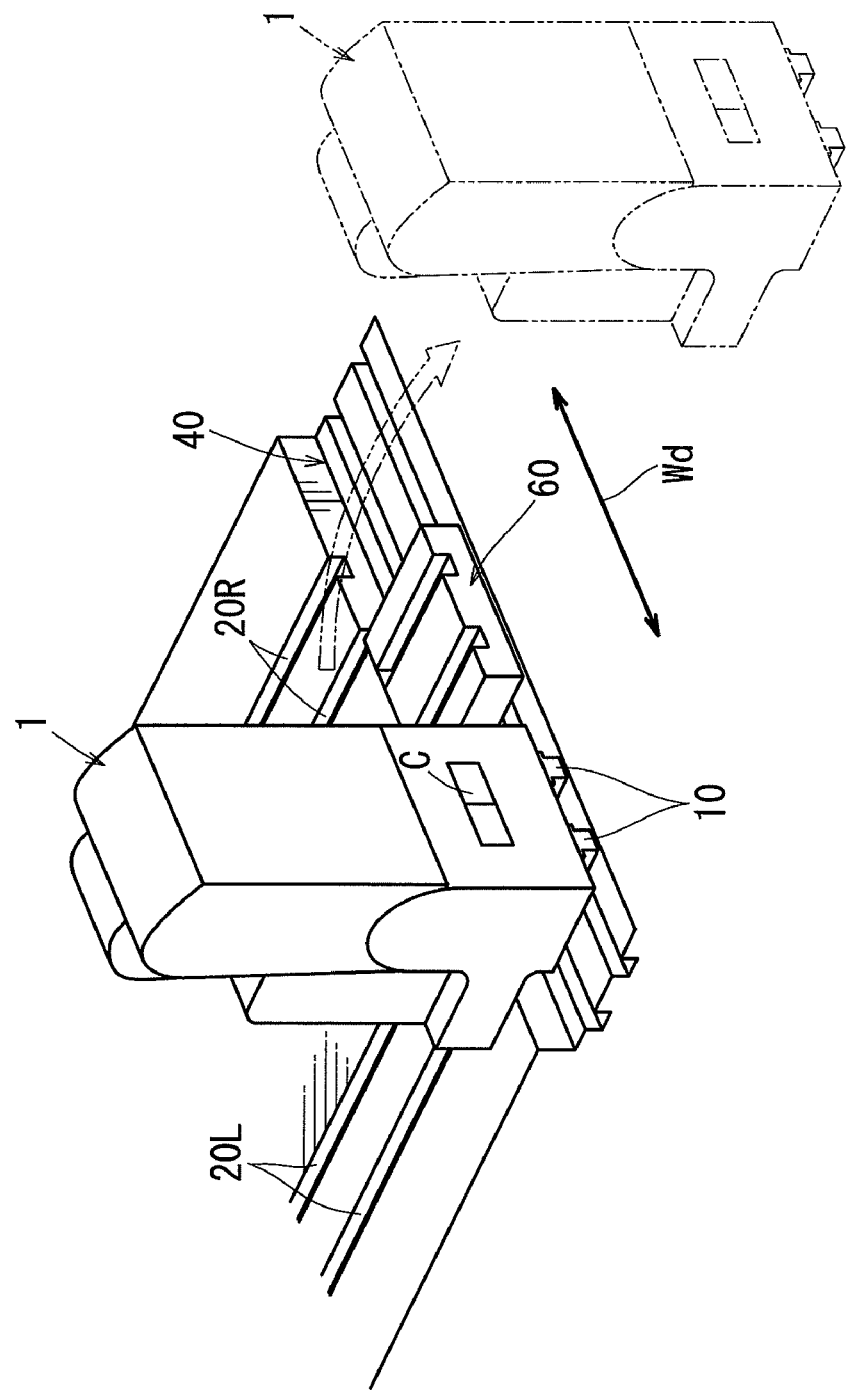

[FIG. 7]
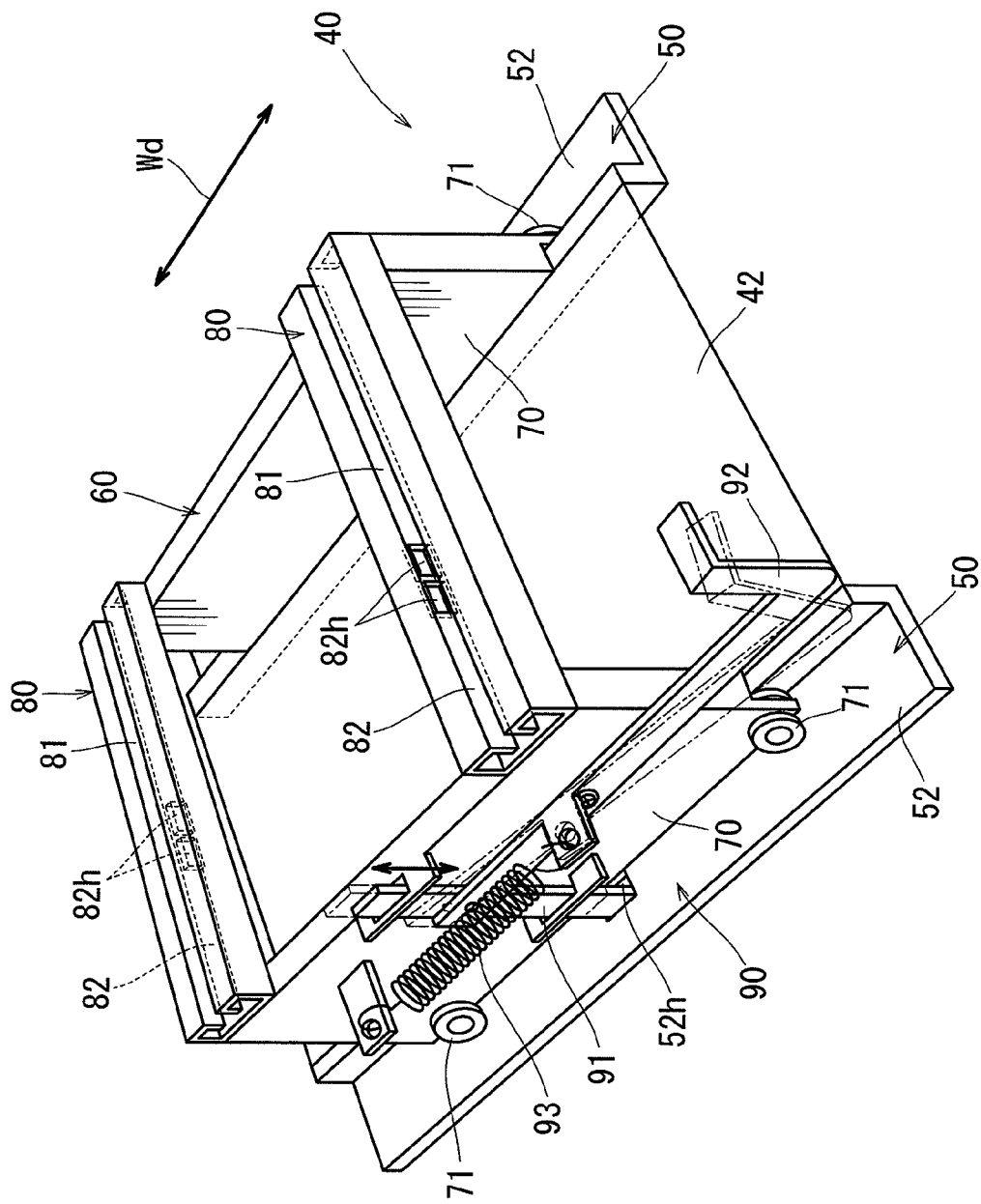

[FIG. 8]
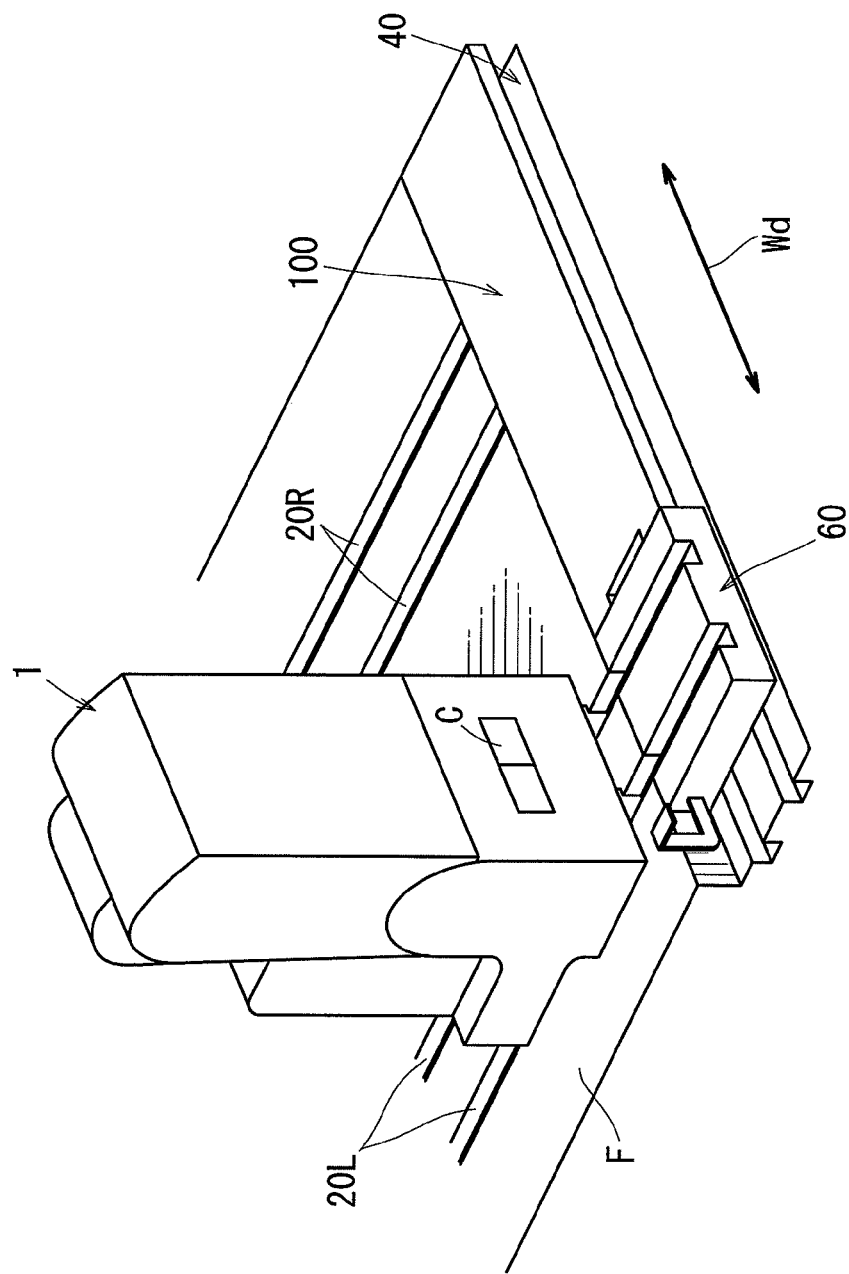

[FIG. 9]
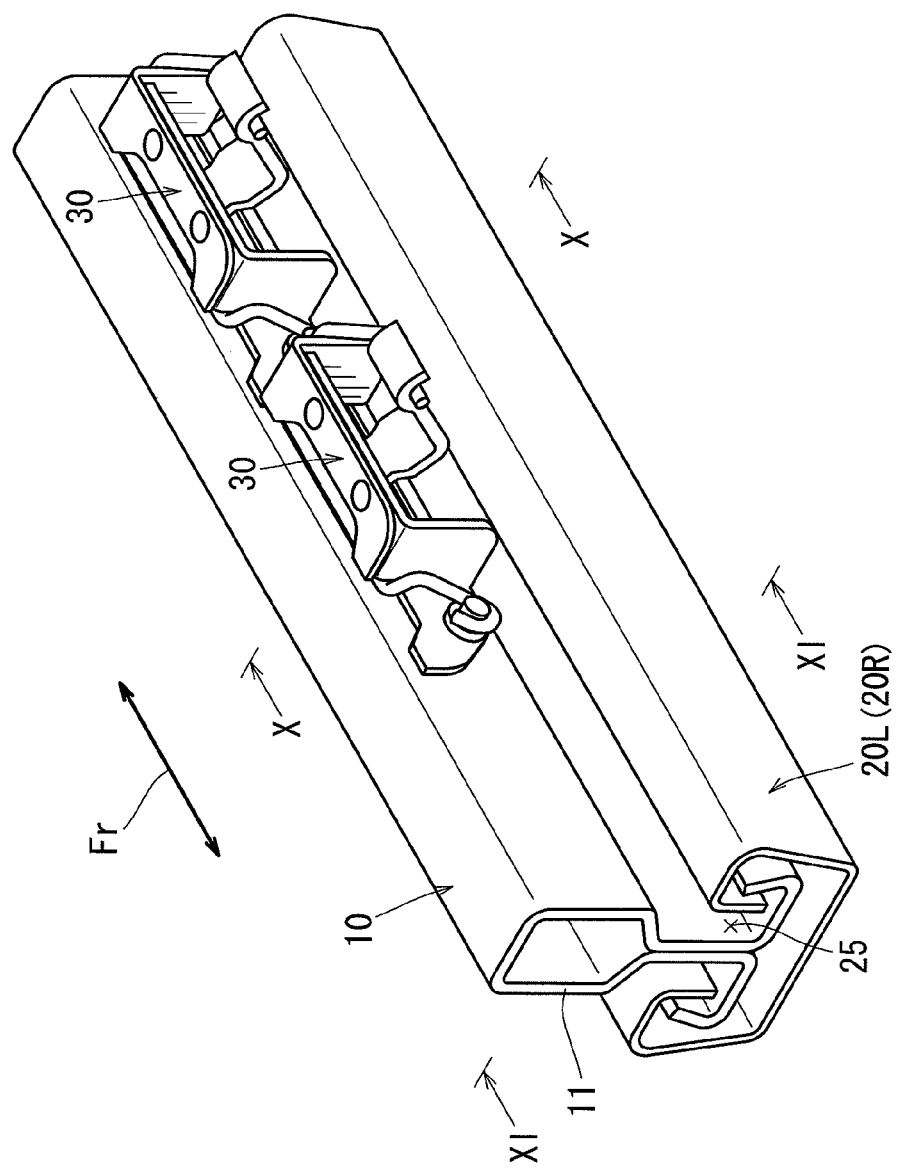

[FIG. 10]
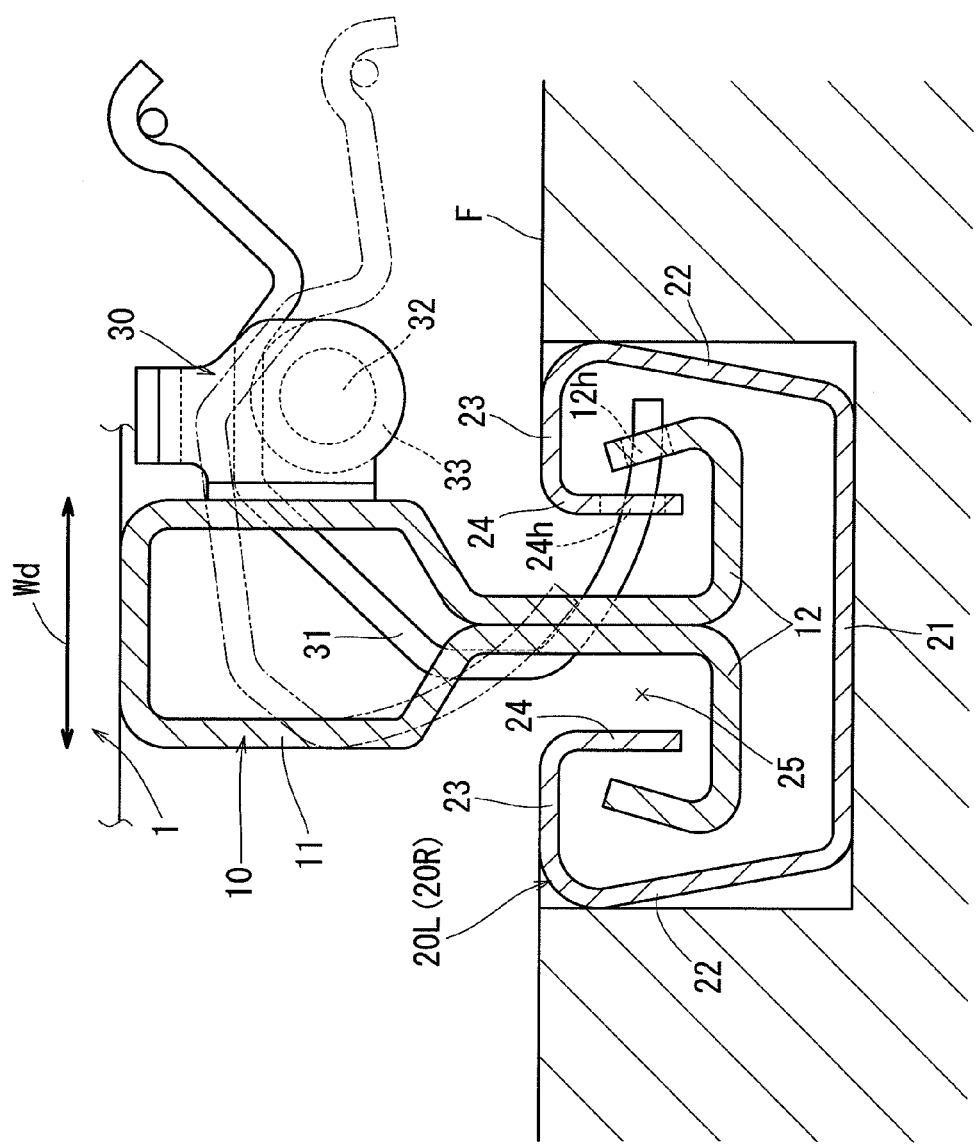

[FIG. 11]
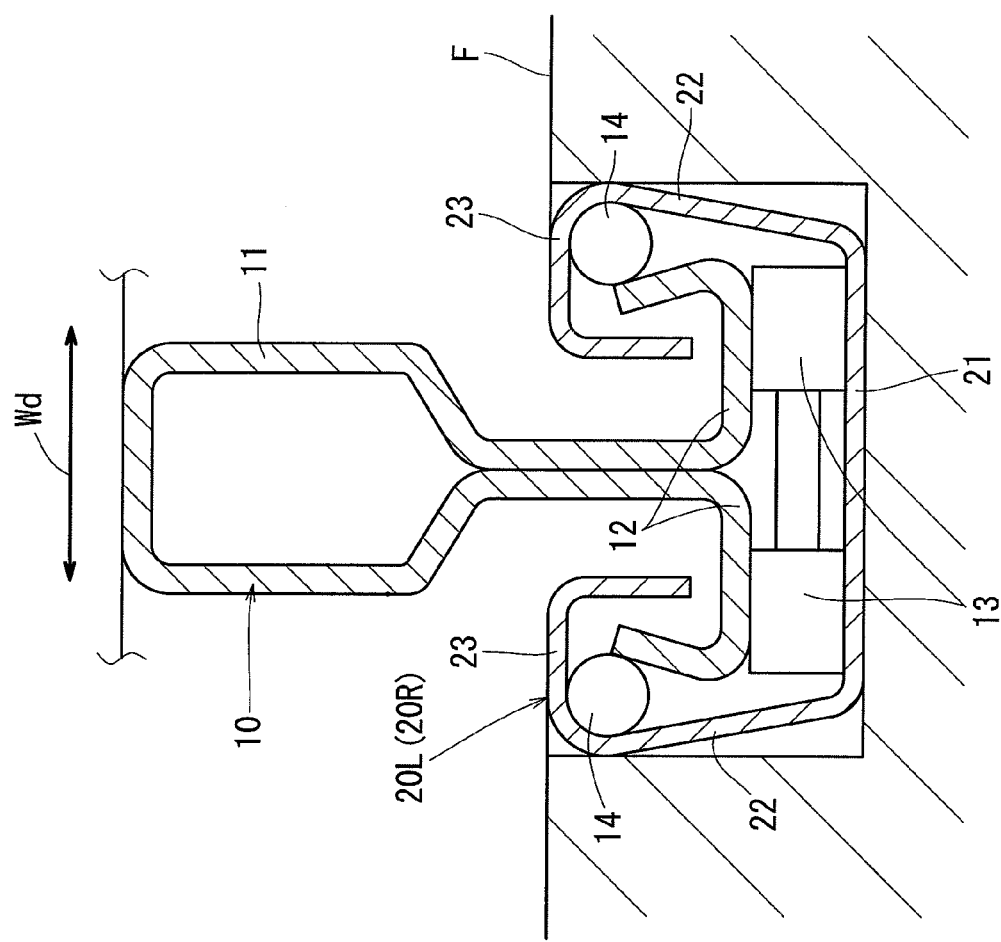

[FIG. 12]
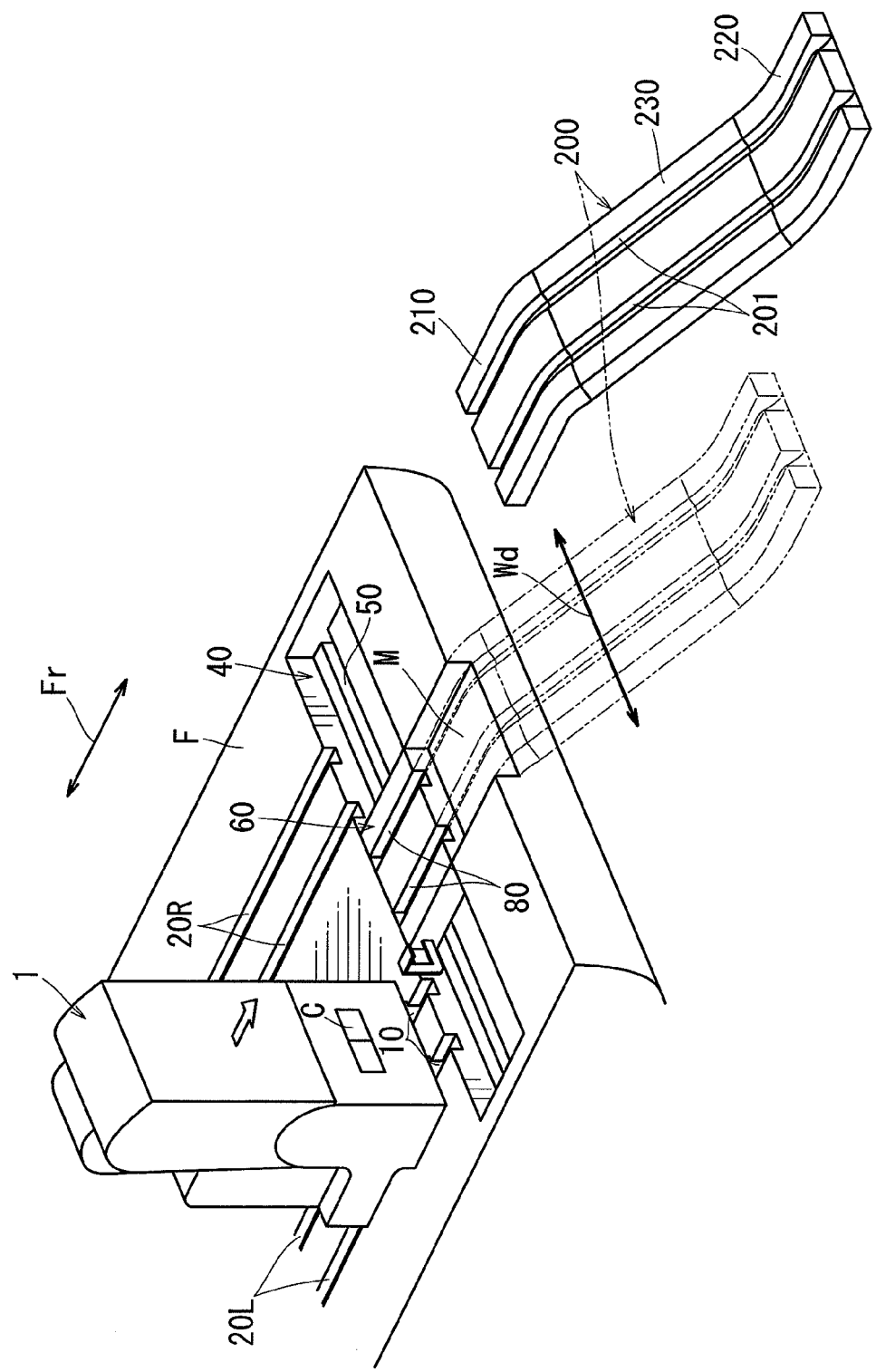

[FIG. 13]
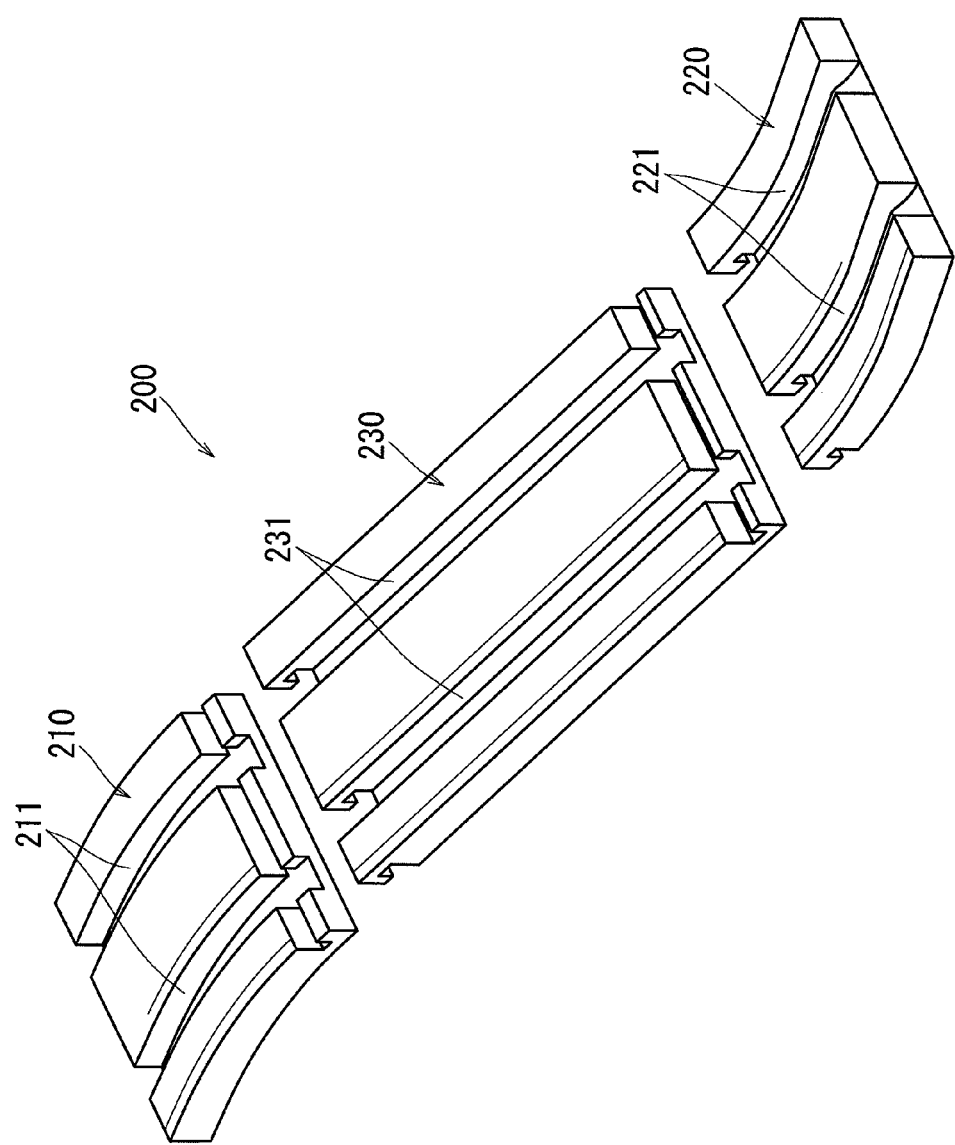

[FIG. 14]
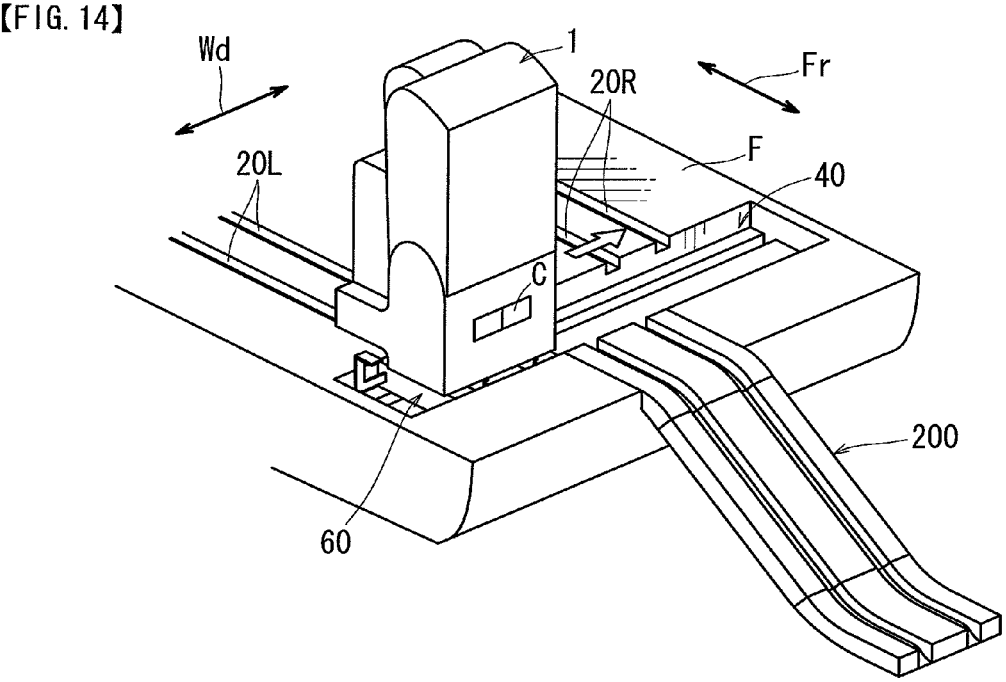
[FIG. 15]
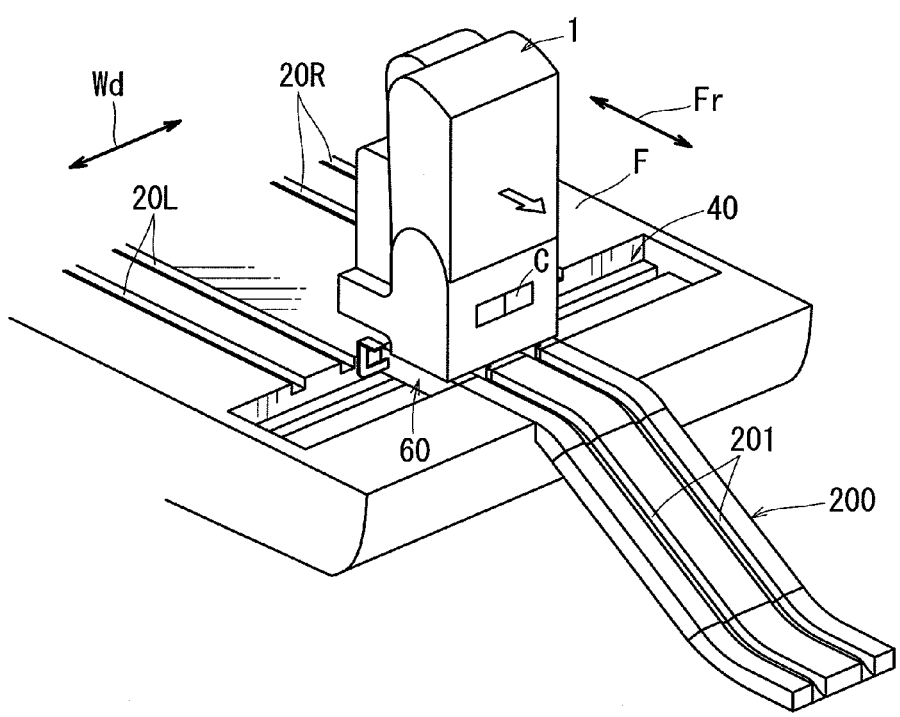

[FIG. 16]
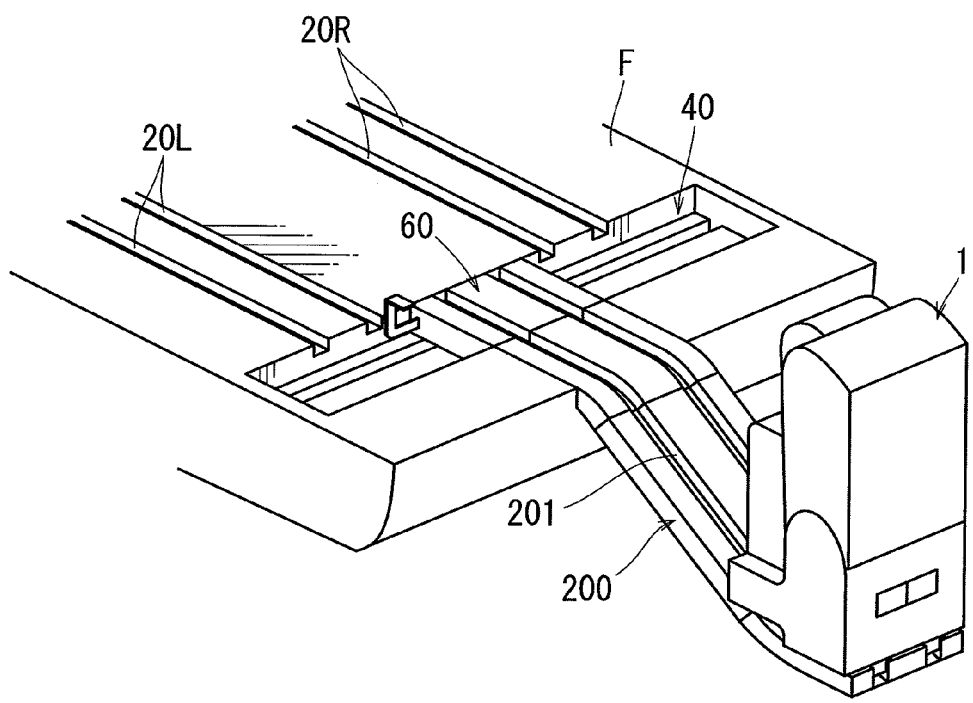

[FIG. 17]
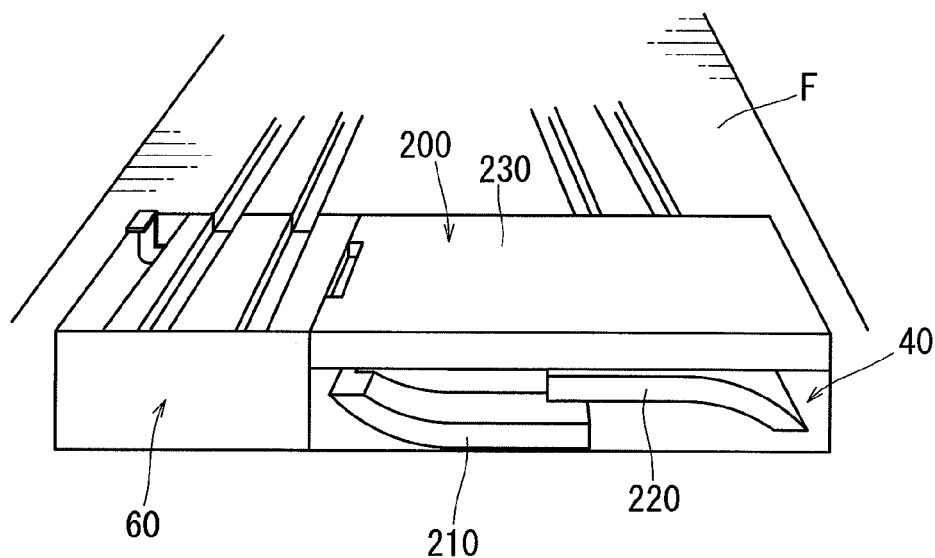

[FIG. 18]
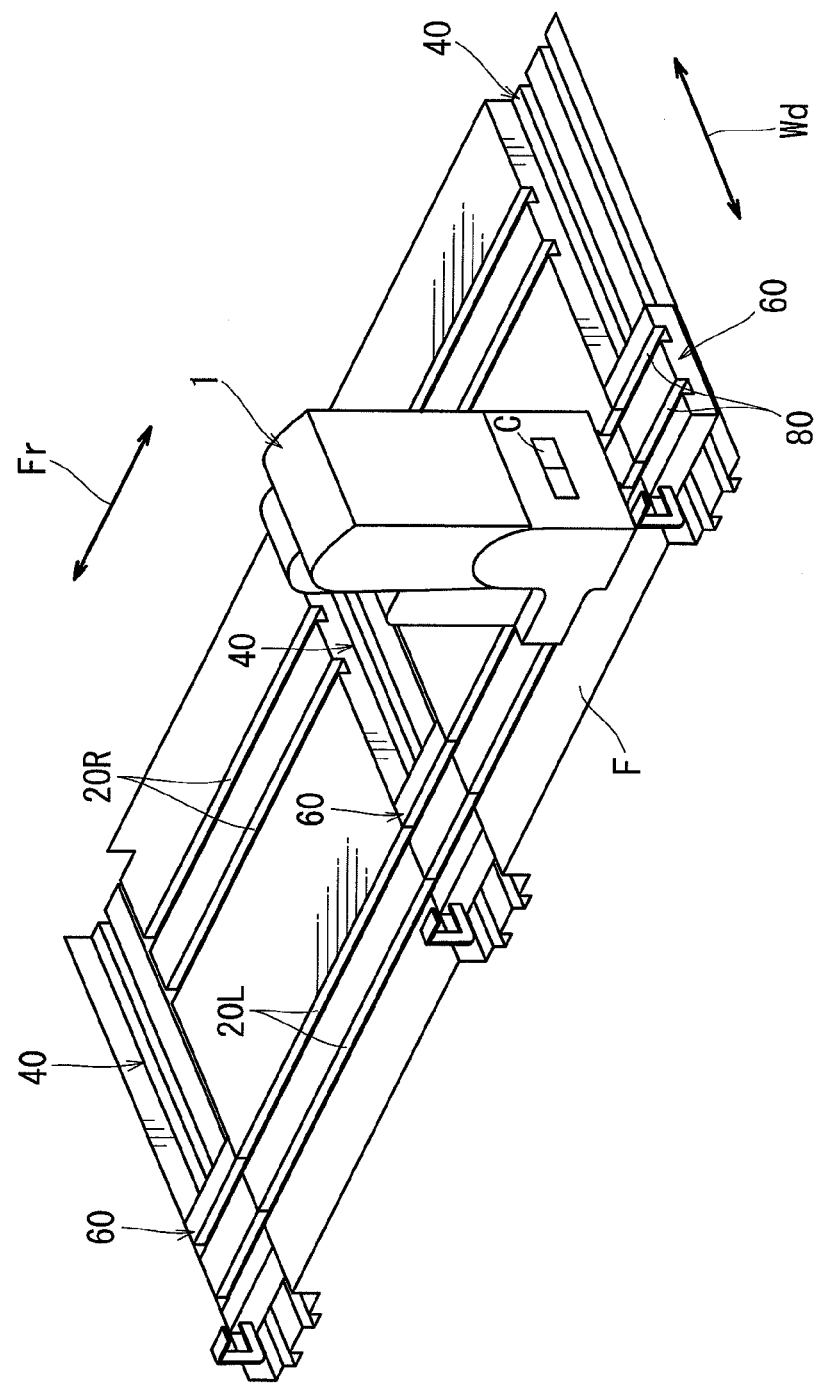

[FIG. 19]
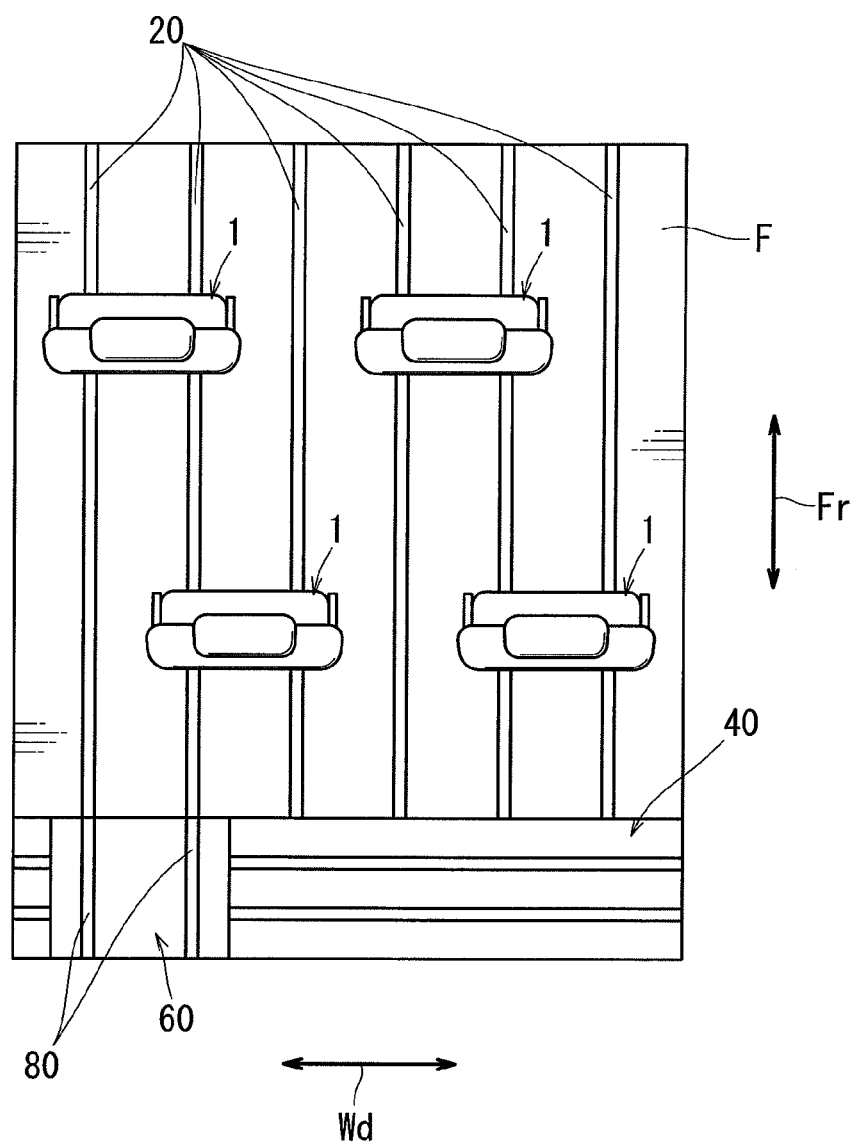

[FIG. 20]
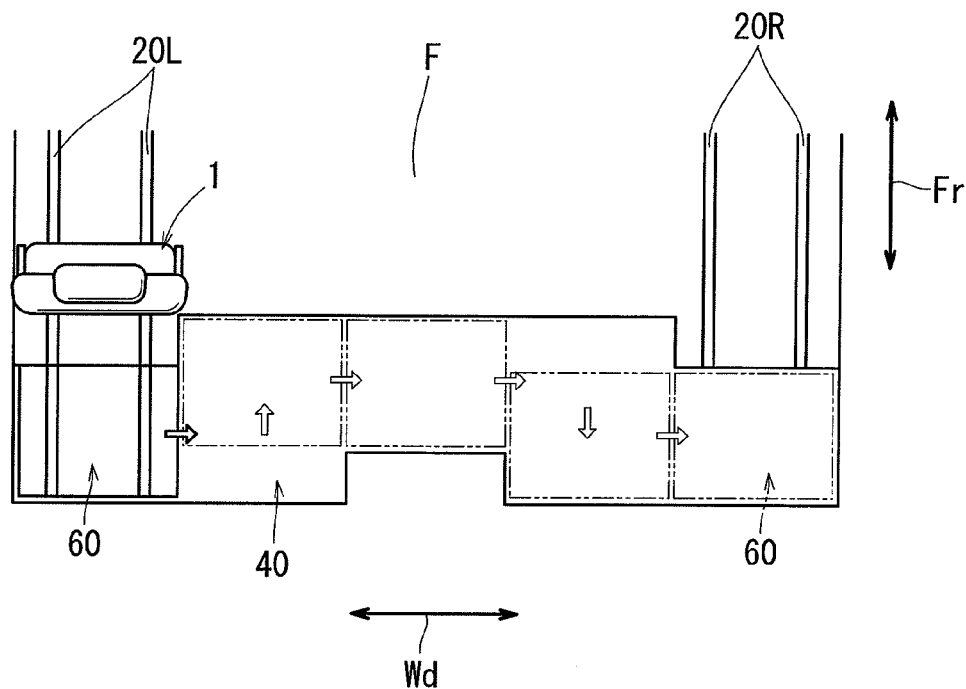
[FIG. 21]
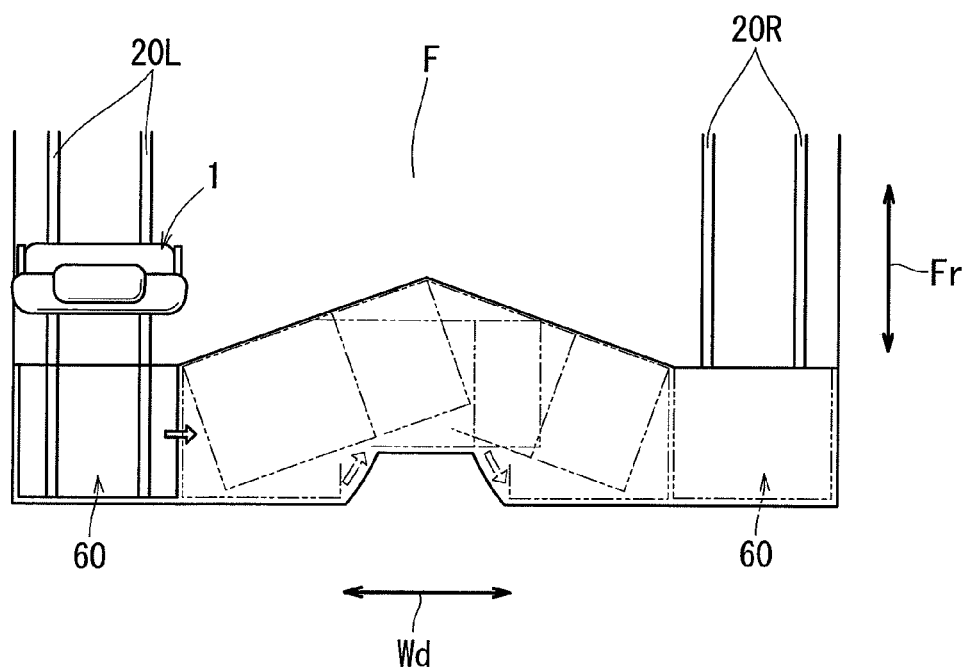

[FIG. 22]
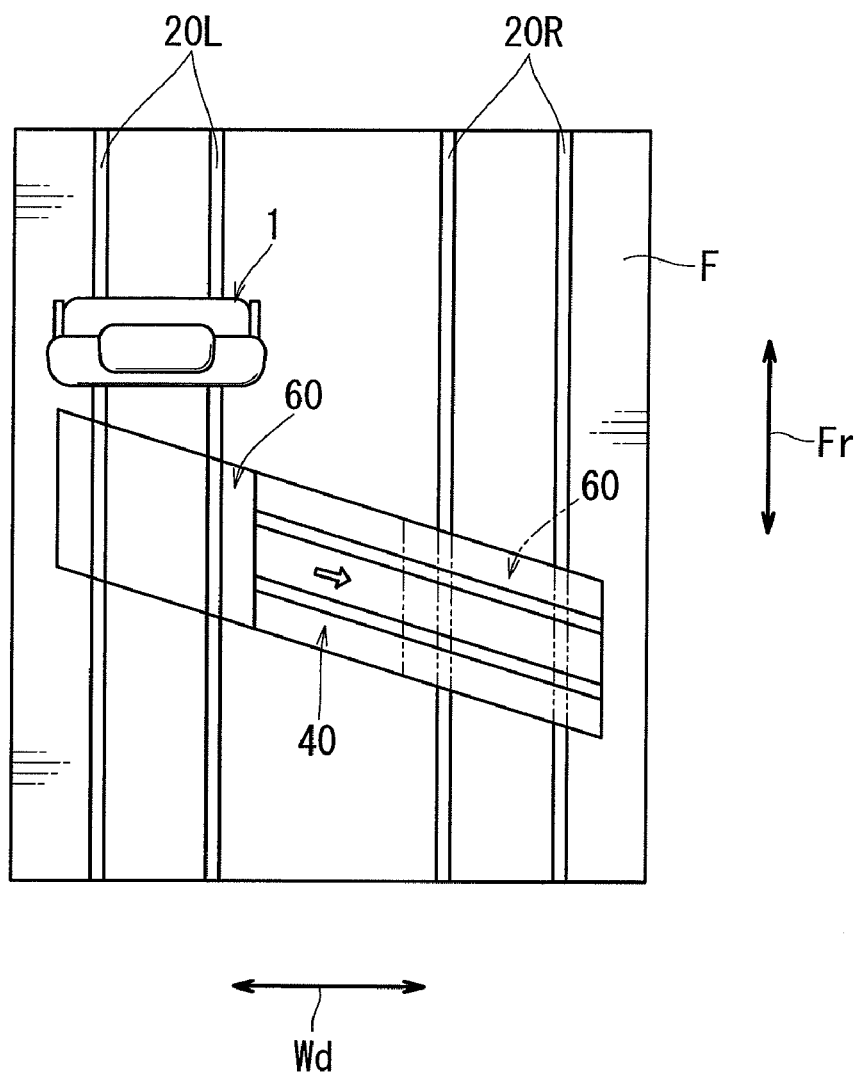

[FIG. 23]
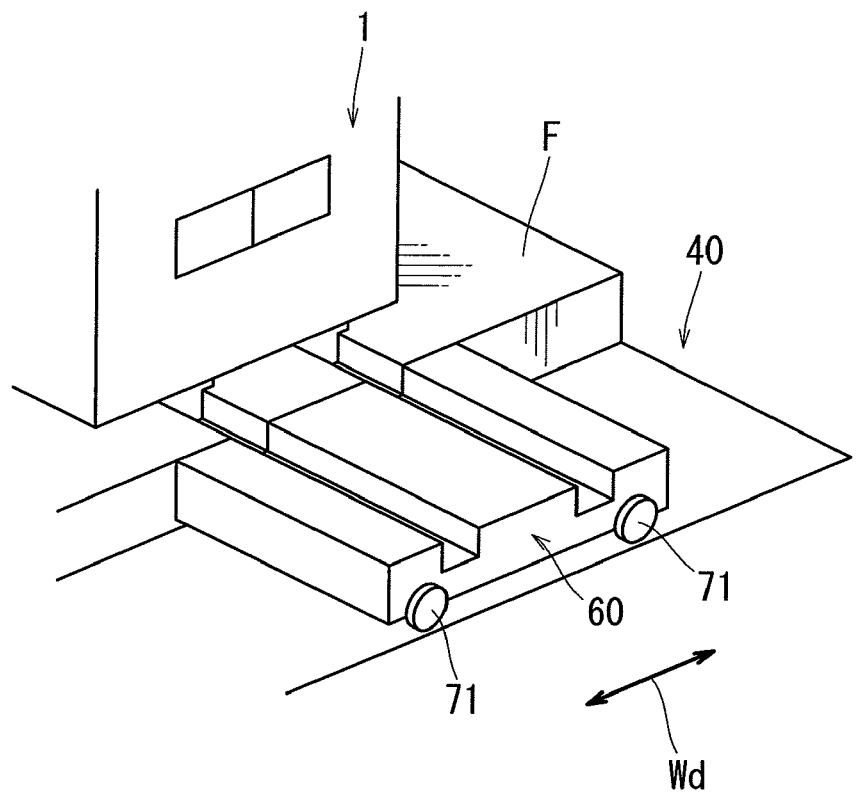
[FIG. 24]
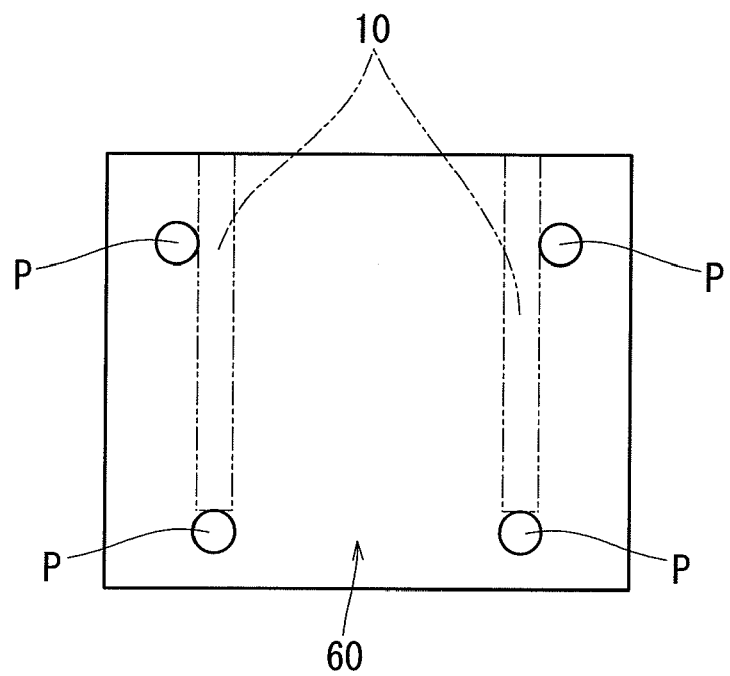

MOVEMENT DEVICE FOR VEHICLE SEAT

TECHNICAL FIELD

The present invention relates to a movement device for a vehicle seat. More specifically, the present invention relates to a movement device for a vehicle seat enabling a seat to move along a vehicle longitudinal direction and along a vehicle width direction in order to attain a change in vehicle seat arrangement.

BACKGROUND ART

A technique disclosed in Japanese Laid-Open Patent Publication No. 2002-120604 is known as an example of this type of movement device for a vehicle seat.

According to the technique disclosed in the above publication, a plurality of seats arranged on a vehicle floor are slidable along network-like slide grooves formed thereon. In this case, each seat is equipped with support-post-like leg parts slidably engaged with the slide grooves. Further, in order to establish mutual communication in the seat sliding movement, the slide grooves are formed to be connected in series in a network-like configuration and extending in the vehicle longitudinal direction and in the vehicle width direction. Therefore, the degree of freedom in the sliding movement for each seat is increased, and various modifications in the seat arrangement are possible.

DISCLOSURE OF THE INVENTION

Problem to be Solved by the Invention

However, while the prior art technique, that is, the technique as disclosed in Patent Document 1, allows each seat to slide in the vehicle longitudinal direction and the vehicle width direction along the slide grooves, this technique is unsuitable for improving the engagement structure for the seats with respect to the vehicle floor. That is, the seats are supported on the vehicle floor solely by the support-post-like leg parts, so for enabling them to withstand a relatively large load as involved at the time of vehicle collision or the like, it is necessary to separately provide a lock structure of high support strength. As a result, the engagement structure for the seats with respect to the vehicle floor becomes rather complicated.

The present invention has been made with a view toward solving the above-mentioned problem. It is an object of the present invention to provide an engagement structure with respect to a vehicle floor for a seat movable in the vehicle longitudinal direction and the vehicle width direction in order to allow the seat arrangement, the engagement structure being relatively simple and facilitating to secure a support strength large enough to withstand a relatively large load as involved at the time of vehicle collision or the like.

Means for Solving the Problem

In order to achieve the above-mentioned object, the movement device for a vehicle seat of the present invention adopts the following means.

First, a first invention is a movement device for a vehicle seat arranged on a vehicle floor and capable of moving a seat in one direction and in a direction crossing the one direction. There are provided a plurality of rows of lower rails disposed on the vehicle floor and extending at least in a forward or rearward direction of a vehicle in order to move the seat and arranged in a vehicle width direction; an upper rail provided on the seat and slidably movably engaged with the lower rails; a guide rail provided in an extension of the lower rail so as to be capable of directly accepting a sliding movement of the upper rail of the seat from the lower rail, as the upper rail is removed from the lower rail into the extension thereof, the upper rail sliding along the forward or rearward direction of the vehicle on the lower rail; a movable member on which the guide rail is placed and which is movable in the vehicle width direction while being separated from the floor; and a conveyance path allowing the movable member to be conveyed along the vehicle width direction between the plurality of rows of lower rails.

According to the first invention, the upper rails provided on the seat and the lower rails provided on the vehicle floor are of a rail structure having the rail width along the vehicle longitudinal direction, and the upper rails are engaged with the lower rails over the entire rail width thereof. With this structure, the seat is maintained in an engaged state in which it is slidable along the forward or rearward direction of the vehicle with respect to the vehicle floor.

Due to the conveyance path, the movable member is movable between the plurality of rows of lower rails along the vehicle width direction. The guide rails capable of directly accepting the sliding movement of the upper rails from the lower rails are disposed on the movable member. Thus, the upper rails of the seat removed from the lower rails onto the extensions thereof are placed on the movable member while being guided by the guide rails. With this structure, the seat is maintained in a state in which the upper rails are situated in the extensions of the lower rails. Further, in the above state in which the seat is placed on the movable member, the movable member is separated from the floor and moved along the vehicle width direction, so that the guide rails are positioned at positions in the extensions of the lower rails constituting the destination of the movement. Thus, as the upper rails of the seat placed on the movable member are slid to the destination lower rails while being guided by the guide rails, the sliding movement of the upper rails is directly accepted by the destination lower rails. With this structure, the upper railed are slidably movably engaged with the destination lower rails.

Next, a second invention is a movement device for a vehicle seat arranged on a vehicle floor and capable of moving a seat in one direction and in a direction crossing the one direction. There are provided a plurality of rows of lower rails disposed on the vehicle floor and extending at least in a forward or rearward direction of a vehicle in order to move the seat and arranged in a vehicle width direction; an upper rail provided on the seat and slidably movably engaged with the lower rails; a guide rail provided in an extension of the lower rail so as to be capable of directly accepting a sliding movement of the upper rail of the seat from the lower rail, as the upper rail is removed from the lower rail into the extension thereof, the upper rail sliding along the forward or rearward direction of the vehicle on the lower rail; a guide member guiding the upper rail while maintaining a height and vertical and horizontal angles thereof with respect to the lower rail when the upper rail of the seat sliding on the lower rail along the forward or rearward direction of the vehicle is removed from the lower rail into an extension thereof; a movable member on which the guide rail is placed and which is movable in the vehicle width direction while being separated from the floor; and a conveyance path allowing the movable member to be conveyed along the vehicle width direction between the plurality of rows of lower rails.

According to the second invention, the upper rails provided on the seat and the lower rails provided on the vehicle floor are of a rail structure having a rail width along the forward or rearward direction of the vehicle, and the upper rails are engaged with the lower rails over the entire rail width thereof. With this structure, the seat is maintained in such a state that it is engaged so as to be slidable along the vehicle longitudinal direction with respect to the vehicle floor.

Due to the conveyance path, the movable member is movable between the plurality of rows of lower rails along the vehicle width direction. The guide members are disposed on the movable member and are capable of receiving the upper rails while maintaining the height and the vertical and horizontal angles of the upper rails with respect to the lower rails. Thus, the upper rails of the seat removed from the lower rails onto the extensions thereof are placed on the movable member while being guided by the guide members. As a result, the seat is maintained in a state in which the upper rails are situated in the extensions of the lower rails. Further, in the above-mentioned state in which the seat is placed on the movable member, as the movable member is separated from the floor and moved along the vehicle width direction, the upper rails, whose attitude is maintained by the guide members, are positioned at positions in the extensions of the lower rails constituting the destination of the movement. Thus, the upper rails of the seat placed on the movable member are slid to the destination lower rails while being guided by the guide members, so that the sliding movement of the upper rails is directly accepted by the destination lower rails. With this structure, the upper rails are slidably engaged with the destination lower rails.

Next, according to a third invention, in the second invention described above, a guide rail is provided in an extension of the lower rail so as to be capable of directly receiving the sliding movement of the upper rail from the lower rail.

According to the third invention, the upper rails of the seat removed from the lower rails onto the extensions thereof are placed on the movable member while being guided by the guide rails. Further, in this placed state of the seat, as the movable member is separated from the floor and moved along the vehicle width direction, the guide rails are positioned at positions in the extensions of the destination lower rails. Thus, by sliding the upper rails of the seat placed on the movable member to the destination lower rails while guiding them along the guide rails, the sliding movement of the upper rails is directly accepted by the destination lower rails. With this structure, the upper rails are slidably engaged with the destination lower rails.

Next, according to a fourth invention, in the first or third invention described above, the lower rails and the guide rail are of the same vertical cross sectional structure.

According to the fourth invention, the engagement structure for the upper rails with respect to the guide rails is the same as that with respect to the lower rails.

Next, according to a fifth invention, in any one of the first through fourth inventions described above, the seat is provided with a slide lock mechanism capable of fixing and restricting a position of the upper rail with respect to the lower rails.

According to the fifth invention, the positions of the upper rails with respect to the lower rails are fixed by the slide lock mechanism, so that the seat is locked at a predetermined position on the vehicle floor. Due to the high support strength of the mutual engagement structure for the upper rails and the lower rails, this slide lock mechanism can be formed in a relatively simple structure. That is, when an abnormal load is applied in a direction for separating the seat from the floor at the time of vehicle collision or the like, the applied force is supported by the engagement structure for the upper rails and the lower rails having a predetermined rail width along the vehicle longitudinal direction. Thus, it is only necessary for the slide lock mechanism to be endowed with a lock strength large enough to restrict the relative slide movement of the upper rails with respect to the lower rails.

Next, according to a sixth invention, in any one of the first through fifth inventions described above, a guide lock mechanism capable of fixing and restricting a position of the seat with respect to the movable member is provided between the seat placed on the movable member and the movable member.

According to the sixth invention, the seat is removed from the lower rails onto the extensions thereof to be placed on the movable member, so that it is locked in the placed state by the guide lock mechanism. With this structure, the upper rails are maintained in a state in which they are positioned in the extensions of the lower rails.

Next, according to a seventh invention, in the sixth invention described above, the guide lock mechanism is constructed to fix the position of the seat by fixing and restricting the position of the upper rail with respect to the guide rails, and the slide lock mechanism is provided on the seat for fixing and restricting the position of the upper rail with respect to the lower rails.

According to the seventh invention, the slide lock mechanism provided on the seat is commonly used as a structure with which locking on both the lower rails and the guide rails can be effected.

Next, according to an eighth invention, in any one of the first through seventh inventions described above, the conveyance path is equipped with a conveyance path side rail extending along the vehicle width direction, and a movable member side rail fixedly installed on the movable member is slidably engaged with the conveyance path side rail.

According to the eighth invention, the movable member is slidable in the vehicle width direction along the rail path formed by slidable engagement between the movable member side rails and the conveyance path side rails. That is, the sliding movement of the movable member in the vehicle width direction is smoothened since it is effected through the rail engagement structure.

Next, according to a ninth invention, in any one of the first through eighth inventions described above, a lock device capable of restricting the position along the vehicle width direction of the movable member with respect to the conveyance path is provided between the movable member and the conveyance path, and the lock device is placed in a lock state whenever at least the upper rail of the seat placed on the movable member is at a position in the extension of the lower rail.

According to the ninth invention, when the movable member moving on the conveyance path is at a position where it can continuously move between the lower rails and the movable member, the movable member is normally locked to restrict its further movement. Thus, at the time of the seat moving operation, it is not necessary for the user to take time and effort to perform positioning of the movable member with respect to the lower rails.

Next, according to a tenth invention, in any one of the first through ninth inventions described above, the lower rails are arranged on right-hand side and left-hand side of the vehicle floor in two rows along the vehicle width direction, and the lower rails on at least one side are long enough to allow two or more seats to be arranged along the forward or rearward direction of the vehicle and to be placed thereon by moving the seats placed on the lower rails on the other side.

According to the tenth invention, a seat placed on the lower rails on the other side can be moved onto the lower rails on one side to arrange and place a plurality of seats on the lower rails on one side, so that a large cabin space is secured on the side of the lower rails arranged on the other side.

Next, according to an eleventh invention, in the tenth invention described above, the lower rails on at least one side are long enough to allow all the movable seats on the right-hand and left-hand sides to be arranged along the vehicle longitudinal direction and placed thereon.

According to the eleventh invention, all the movable seats on the right-hand and left-hand sides can be arranged and placed on the lower rails on one side, so that a large cabin space is secured on the side of the lower rails arranged on the other side.

Next, according to a twelfth invention, in the tenth or eleventh invention described above, the seats arranged along the forward or rearward direction and placed on at least on the lower rails on one side are positioned in a tip-up attitude in which seat cushions constituting seating portions are raised and rotated toward seat backs constituting backrest portions.

According to the twelfth invention, the width of each seat in the forward or rearward direction can be reduced by being brought into the tip-up state. Thus, by bringing the seats into the tip-up state and arranging and placing them on the lower rails on one side, the seats can be brought together compactly in the forward or rearward direction.

Next, according to a thirteenth invention, in any one of the first through twelfth inventions described above, the conveyance path in the vehicle width direction is disposed at a rear end of the lower rails.

According to the thirteenth invention, by sliding the seat placed on the lower rails to the rear side, the upper rails are removed from the rear ends of the lower rails onto the extensions thereof, so the seat is placed on the movable member.

Next, according to a fourteenth invention, in any one of the first through thirteenth inventions described above, the conveyance path in the vehicle width direction is formed as a recess extending in the vehicle width direction and recessed with respect to the vehicle floor surface in a vertical cross section as seen in the forward or rearward direction of the vehicle, and the length of the recess in the forward or rearward direction of the vehicle is the length allowing storage of the movable member.

According to the fourteenth invention, the movable member is received within the recess formed so as to be recessed from the vehicle floor surface as the conveyance path, and can move within this recess along the vehicle width direction.

Next, according to a fifteenth invention, in the fourteenth invention described above, an upper surface of the movable member movably received and installed in the recess serving as the conveyance path is set to be the same level as the vehicle floor; a cover member is detachably fitted into the recess serving as the conveyance path and is capable of closing an opening portion of the recess where the movable member is installed; and an upper surface of the cover member is at the same level as the vehicle floor in a state in which the cover member is fitted into the opening portion of the recess.

According to the fifteenth invention, the opening portion of the recess where the movable member is installed is closed from the outside by the cover member. The movable member and the cover member installed in the recess are at the same level as the vehicle floor.

Next, according to a sixteenth invention, in the fifteenth invention described above, the cover member constitutes a stopper restricting the movement of the movable member in the vehicle width direction in the state in which the cover member is fitted into the opening portion of the recess.

According to the sixteenth invention, the cover member is installed at the opening portion of the recess, so that the movement of the movable member in the vehicle width direction is restricted.

Effects of the Invention

Due to the adoption of the above-mentioned means, the present invention provides the following effects.

First, according to the first invention, a structure for engaging a seat with a vehicle floor so as to allow it to slide along the forward or rearward direction with respect to the vehicle floor is realized by an engagement structure between rails, and there is provided a movable member which separates the seat from the vehicle floor and moves it along the vehicle width direction to allow it to move between lower rails. As a result, the structure for engaging the seat with the vehicle floor can be realized by a relatively simple construction which facilitates securing of a support strength large enough to withstand a relatively large load as involved at the time of vehicle collision or the like. Further, by providing the movable member with guide rails, it is possible to maintain the same attitude of the seat with respect to the movable member as that given when the sliding movement of upper rails is directly accepted from the lower rails. As a result, the seat can always be moved to the movable member and to destination lower rails solely through the forward or rearward movement.

Further, according to the second invention, a structure for engaging a seat with a vehicle floor so as to allow it to slide along the forward or rearward direction with respect to the vehicle floor is realized with an engagement structure between rails, and there is provided a movable member which separates the seat from the vehicle floor and moves it along the vehicle width direction to allow it to move between lower rails. As a result, the structure for engaging the seat with the vehicle floor can be realized by a relatively simple construction which facilitates securing of a support strength large enough to withstand a relatively large load as involved at the time of vehicle collision or the like. Further, by providing the movable member with guide members, it is possible to keep the attitude of the seat with respect to the movable member such that the height and the vertical and horizontal angles of the upper rails with respect to the lower rails are maintained. As a result, the seat can always be moved to the movable member and to destination lower rails solely through the forward or rearward movement.

Further, according to the third invention, the guide members are guide rails capable of directly accepting the sliding movement of the upper rails from the lower rails, so that it is possible to maintain the same attitude of the seat with respect to the movable member as that given when the sliding movement of the upper rails is directly accepted from the lower rails.

Further, according to the fourth invention, the lower rails and the guide rails are of the same vertical cross sectional structure, so that it is possible for the engagement structure for the upper rails to be the same for both the lower rails and the guide rails, thus achieving rationalization of a component design.

Further, according to the fifth invention, a slide lock mechanism is provided on an engagement structure between rails of high support strength, so that it is possible to form relatively easily a lock structure of high support strength capable of withstanding a relatively large load as involved at the time of vehicle collision or the like.

Further, according to the sixth invention, due to the provision of a guide lock mechanism, it is possible to lock the seat in the state in which it has been slid from the lower rails onto the movable member. Thus, it is possible to move the seat in a stable manner in the vehicle width direction by means of the movable member.

Further, according to the seventh invention, the same construction as that of the slide lock mechanism is applied to the guide lock mechanism, so that it is possible to use the same lock structure for the locking of the upper rails, thus achieving rationalization of a component design.

Further, according to the eighth invention, a rail engagement structure is applied to the structure for moving the movable member along the vehicle width direction, so that the movement of the movable member in the vehicle width direction can be effected smoothly and more appropriately.

Further, according to the ninth invention, due to the provision of a lock device, it is possible to lock the movement of the movable member along the vehicle width direction whenever the seat is at a position where it can move toward destination lower rails. Thus, there is no need to perform positioning of the movable member along the vehicle width direction, thus facilitating the requisite operation.

Further, according to the tenth invention, it is possible to move a seat on the lower rails on the other side to the lower rails on one side to arrange and place a plurality of seats thereon, so it is possible to secure a large cabin space on the other side.

Further, according to the eleventh invention, all the movable seats on the right-hand and left-hand sides can be arranged and placed on the lower rails on one side, so it is possible to secure a larger cabin space on the other side.

Further, according to the twelfth invention, the seats are arranged on the lower rails on one side in a tip-up attitude, so that the seats can be brought together compactly along the longitudinal direction.

Further, according to the thirteenth invention, the seat is moved in the vehicle width direction at the rear end side of the lower rails, so that it is possible, for example, to effect the movement of the seat along the vehicle width direction from the vehicle-rear-door side. Further, since the movable member is not allowed to enter the movement route of the lower rails, the sliding movement of the seat in the forward or rearward direction and the movement thereof in the vehicle width direction can be easily conducted in distinction from each other, thereby achieving an improvement in terms of operability.

Further, according to the fourteenth invention, the movable member is received within the recess to move therein, so that the movement structure for the movable member is made relatively simple while achieving space saving.

Further, according to the fifteenth invention, the opening portion of the recess as the conveyance path can be closed by the cover member, so it is possible to avoid impairing the appearance of the vehicle interior in spite of the formation of the recess. Further, by configuring the cover member and the movable member installed in the recess to be flush with the vehicle floor, it is possible to suppress protrusion on the vehicle floor, so that the appearance of the vehicle interior is improved. Further, since the recess is closed, it is possible to restrict the movement of the seat such that the seat on the lower rails is not accidentally allowed to move into the recess.

Further, according to the sixteenth invention, due to the installation of the cover member, it is possible to restrict the movement of the movable member along the vehicle width direction, so that an accidental operation of the movable member can be prevented.

BRIEF DESCRIPTION OF THE DRAWINGS

FIG. 1 is a schematic perspective view showing the construction of a movement device for a vehicle seat according to Embodiment 1.

FIG. 2 is a perspective view of a seat as placed on a carriage.

FIG. 3 is a perspective view showing the carriage as moved in the vehicle width direction from the position of FIG. 2.

FIG. 4 is a perspective view of the seat as transferred to destination lower rails.

FIG. 5 is a perspective view showing how all the movable seats on the right-hand and left-hand sides are brought together on the lower rails on one side.

FIG. 6 is a perspective view showing how the seat is removed by detaching the upper rails from the rear ends of the lower rails.

FIG. 7 is a perspective view of an engagement structure for the carriage and the recess.

FIG. 8 is a perspective view showing how a cover member is installed.

FIG. 9 is a perspective view of an engagement structure for the upper rail and the lower rail.

FIG. 10 is a sectional view taken along the line X-X of FIG. 9.

FIG. 11 is a sectional view taken along the line XI-XI of FIG. 9.

FIG. 12 is a schematic perspective view of a movement device for a vehicle according to Embodiment 2.

FIG. 13 is an enlarged perspective view of the construction of a slope.

FIG. 14 is a perspective view of the seat as placed on the carriage.

FIG. 15 is a perspective view of a state in which the carriage has been moved to the position where the slope is installed.

FIG. 16 is a perspective view showing how the seat is caused to get off the vehicle floor along the slope.

FIG. 17 is a schematic diagram showing how the slope is accommodated.

FIG. 18 is a perspective view of a movement device for a vehicle seat according to another embodiment.

FIG. 19 is a perspective view of a movement device for a vehicle seat according to another embodiment.

FIG. 20 is a perspective view of a movement device for a vehicle seat according to another embodiment.

FIG. 21 is a perspective view of a movement device for a vehicle seat according to another embodiment.

FIG. 22 is a perspective view of a movement device for a vehicle seat according to another embodiment.

FIG. 23 is a perspective view of a movement device for a vehicle seat according to another embodiment.

FIG. 24 is a perspective view of a movement device for a vehicle seat according to another embodiment.

BEST MODE FOR CARRYING OUT THE INVENTION

In the following, embodiments of the best mode for carrying out the present invention will be described with reference to the drawings.

Embodiment 1

First, a movement device for a vehicle seat according to Embodiment 1 will be described with reference to FIGS. 1 through 11. FIG. 1 is a schematic perspective view showing the construction of a movement device for a vehicle seat. FIG.

2 is a perspective view showing a state in which a seat 1 is placed on a carriage 60. FIG. 3 is a perspective view showing a state in which the carriage 60 has been moved in a vehicle width direction Wd from the position of FIG. 2. FIG. 4 is a perspective view showing a state in which the seat 1 is transferred to destination lower rails 20R. FIG. 5 is a perspective view showing how all the movable seats 1b through 1f on the right-hand and left-hand sides are brought together on the lower rails 20R on one side. FIG. 6 is a perspective view showing how the seat 1 is removed by detaching the upper rails 10 from the rear ends of the lower rails 20L. FIG. 7 is a perspective view showing an engagement structure for the carriage 60 and a recess 40. FIG. 8 is a perspective view showing how a cover member 100 is installed. FIG. 9 is a perspective view showing an engagement structure for the upper rail 10 and the lower rail 20L (20R). FIG. 10 is a sectional view taken along the line X-X of FIG. 9. FIG. 11 is a sectional view taken along the line XI-XI of FIG. 9.

Note that, to clearly illustrate the internal structure of the carriage 60, FIG. 7 depicts the frame structure of the carriage, with the shell member thereof being removed.

As is seen from FIG. 1, according to the movement device for the vehicle seat of this embodiment, the seat 1 installed on the vehicle floor F can move between the lower rails 20L and the lower rails 20R respectively arranged on the left-hand side and the right-hand side of the vehicle floor F.

Here, the lower rails 20L, 20R are arranged to extend straight in a forward or rearward direction Fr of the vehicle. The lower rails 20L, 20R are respectively configured as pairs of rails each constituted by two rail members, and they are of the same structure in a vertical cross section. More specifically, each rail member is formed to have a recessed configuration in a vertical cross section. The rail members are embedded in the vehicle floor F, and recessed openings 25 formed to extend along the longitudinal direction thereof are exposed on the upper surface of the vehicle floor F.

Further, the upper rails 10 installed on the lower portion of the seat 1 are slidably engaged with the lower rails 20L, 20R. In correspondence with the rail structure of the lower rails 20L, 20R, the upper rails 10 are configured as a pair of rails constituted by two rail members. In the state shown in FIG. 1, the upper rails 10 of the seat 1 are engaged with the lower rails 20L arranged on the left-hand side of the vehicle. That is, due to the engagement structure between the rails, in which the upper rails 10 and the lower rails 20L (20R) are engaged with each other, the seat 1 is supported on the vehicle floor F so as to be slidable in the forward or rearward direction Fr.

Further, at the rear end position of the lower rails 20L, a recess 40 is formed to establish connection between the rear end positions of the lower rails 20R. In a vertical cross section when viewed from the forward or rearward direction Fr of the vehicle, the recess 40 is recessed from the upper surface of the vehicle floor F. Further, the recess 40 is formed to extend straight in the vehicle width direction Wd so as to connect the rear ends of the lower rails 20L, 20R.

Further, the carriage 60 is received within the recess 40 and is slidable therein in the vehicle width direction Wd. Here, the carriage 60 corresponds to the movable member of the present invention. The carriage 60 is separated from the vehicle floor F, and is configured to conform to the vertical sectional configuration of the recess 40 such that its upper surface is at the same level as the upper surface of the vehicle floor F. Further, the carriage 60 is slidable within the recess 40 in the vehicle width direction Wd. As shown in FIGS. 2 and 3, the carriage 60 can move between the rear end position of the lower rails 20L and the rear end position of the lower rails 20R.

As shown in FIG. 2, by positioning the carriage 60 at the rear end position of the left-hand side lower rails 20L, the seat 1, which was engaged with the lower rails 20L, can be transferred to the carriage 60 through sliding movement. Thus, as shown in FIG. 3, by moving the carriage 60 with the seat 1 placed thereon in the vehicle width direction Wd, it is possible to convey the seat 1 to the rear end position of the right-hand side lower rails 20R. As a result, as shown in FIG. 4, the seat 1 placed on the carriage 60 can now be transferred to the destination lower rails 20R through sliding movement.

In this way, with the movement device for the vehicle seat of this embodiment, the seat 1 placed on the vehicle floor F can freely move to and from each of the lower rails 20L, 20R, thereby making it possible to vary the arrangement state of the seat 1 (seat arrangement).

In the following, each component mentioned above will be described in detail.

First, with reference to FIGS. 9 and 10, the engagement structure of the upper rails 10 provided on the seat 1 and the lower rails 20L, 20R provided on the vehicle floor F will be described. Here, as stated above, the upper rails 10 and the lower rails 20L, 20R are configured as pairs of rails each constituted by two rail members, with each rail member being of the same engagement structure. Thus, in the following, only the engagement structure for the rail member on one side of each pair will be described. Further, the lower rails 20L, 20R are of the same structure, so only the lower rail 20L on one side will be described.

Accordingly, as shown in FIG. 9, the upper rail 10 extends straight in the forward or rearward direction Fr of the vehicle and has a rail width in the forward or rearward direction. As shown in FIG. 1, the upper rail 10 is disposed at the lower portion of the seat 1, and is integrally fixed to the seat 1. Further, the upper rail 10 is mounted by being longitudinally inserted into an opening end 26 formed at the rear end of the lower rail 20L. As a result, as shown in FIG. 9, the upper rail 10 is brought into an assembled state in which it is not upwardly detached through an opening 25 of the lower rail 20L.

Here, the vertical cross sectional configuration of the upper rail 10 will be briefly described with reference to FIG. 10. That is, the upper rail 10 is formed by continuously folding a single elongated metal plate, and exhibits a vertical cross sectional configuration that is a substantially O-shape. As a result, the upper rail 10 is formed to have a vertical cross sectional configuration constituted by a support leg portion 11 fixed to the lower side of the seat 1, and turned-back portions 12 outwardly turned back from the lower end side of the support leg portion 11. Further, the upper rail 10 is engaged with the lower rail 20L such that the lower half portion thereof extending from the constricted portion of the support leg portion 11 to the turned-back portions 12 enters into the interior of the lower rail 20L. Further, one of the turned-back portions 12 has a through-hole 12h into which a lock claw 31 of a slide lock mechanism 30 (that will be described later) can be hooked. The through-holes 12h are formed at two positions of the upper rail 10 longitudinally spaced apart from each other, allowing simultaneous hooking-in of the lock claw 31 with two claw-shaped portions.

Further, as shown in FIG. 11, rollers 13 are provided on the bottom surface portion of the upper rail 10. Further, bearings 14, 14 are provided on both outer side surfaces of the turned-back portions 12 of the upper rail 10. The former, i.e., a plurality of rollers 13, are provided at appropriate intervals along the longitudinal direction of the upper rail 10, and are in contact with the bottom surface portion 21 of the lower rail 20L. Further, the latter, i.e., a plurality of bearings 14, 14 are provided at appropriate intervals along the longitudinal direction of the upper rail 10, and abut the side surface portions 22, 22 and upper surface portions 23, 23 of the lower rail 20L. The rollers 13 and the bearings 14, 14 roll as the upper rail 10 slides relative to the lower rail 20L. Thus, due to the arrangement of the rollers 13 and the bearings 14, 14, the upper rail 10 is prevented from rattling vertically and horizontally with respect to the lower rail 20L, and the sliding movement thereof can be effected smoothly.

Next, as shown in FIG. 9, like the upper rail 10, the lower rail 20L extends straight in the forward or rearward direction Fr of the vehicle. Further, as shown in FIG. 10, the lower rail 20L is embedded within the vehicle floor F, and is integrally fixed to the vehicle floor F.

Here, with reference to the same figures, the vertical cross sectional configuration of the lower rail 20L will be briefly described. That is, like the upper rail 10, the lower rail 20L is formed by continuously folding a single elongated metal plate, and has a substantially recessed vertical cross sectional configuration. As a result, the lower rail 20L is formed to have a vertical cross sectional configuration constituted by the bottom surface portion 21, the side surface portions 22, 22 raised from both sides of the bottom surface portion 21, the upper surface portions 23, 23 inwardly bent at the upper ends of the side surface portions 22, 22, and inner surface portions 24, 24 bent downwardly at the inner ends of the upper surface portions 23, 23. As shown in FIG. 10, the lower rail 20L is arranged such that the opening 25 formed between the side surface portions 24, 24 is exposed on the upper surface of the vehicle floor F. Further, by inserting the upper rail 10 into the interior of the lower rail 20, an engagement state is attained in which the upper half portion (support leg portion 11) of the upper rail 10 is exposed through the opening 25, and in which four sides of the lower half portion (turned-back portions 12) of the upper rail 10 are surrounded by the upper, lower, and side surface portions.

Further, one inner surface portion 24 is formed with through-holes 24h into which the lock claw 31 of the slide lock mechanism 30 that will be described later can be hooked. In correspondence with the through-holes 12h formed in the upper rail 10, the through-holes 24h are formed in pairs, with a plurality of the pairs being formed at appropriate intervals along the longitudinal direction of the upper rail 10. As a result, by sliding the upper rail 10, the through-holes 12h (formed in the upper rail 10) and the through-holes 24h (formed in the lower rail 20L) can be aligned with each other on the outer and inner sides at an appropriate slide position.

Referring back to FIG. 9, slide lock mechanisms 30 capable of locking the sliding movement of the upper rail 10 with respect to the lower rail 20L are provided on the outer side of the support leg portion 11 of the upper rail 10. As shown in FIG. 10, the slide lock mechanisms 30 have the lock claws 31 operable to be inserted into and extracted from the through-holes 12h formed in the upper rail 10 and the through-holes 24 formed in the lower rail 20L.

A rotational shaft 32 rotatably supports each lock claw 31, and as it rotates, the two claw-shaped portions are simultaneously inserted into or extracted from the through-holes 12h formed in the upper rail 10. Further, the lock claw 31 is normally urged so as to rotate counterclockwise as seen in the sheet by a torsion spring 33 provided between itself and the upper rail 10. Thus, when in a state in which the through-holes 12h, 24h are not aligned with each other depending on the position of the sliding movement of the upper rail 10, that is, when in a state in which the inner surface portion 24 of the lower rail 20L is situated on the inner side of the through-hole 12h, the lock claw 31 is maintained while abutting the surface of the inner surface portion 24 due to the urging force. In this state, the upper rail 10 is slidable in the forward or rearward direction Fr with respect to the lower rail 20L. However, as indicated by the solid line in FIG. 10, when the through-holes 12h, 24h are aligned with each other with respect to the outer and inner directions through sliding movement of the upper rail 10, the lock claw 31 is automatically inserted into the through-hole 24h and further into the through-hole 12h due to the urging force. As a result, the upper rail 10 is placed in a state in which it cannot slide in the forward or rearward direction Fr with respect to the lower rail 20L, that is, the slide position is fixed and restricted.

This lock state due to the lock claw 31 can be released by rotating it clockwise against the urging force of the torsion spring 33. As a result, the upper rail 10 can be restored to the state in which it can slide with respect to the lower rail 20L. The operation of releasing the lock claw 31 can be effected by means of a releasing lever connected to the lock claw 31 (releasing lever C arranged on the rear side of seat 1 shown in FIG. 1).

Next, referring back to FIG. 1, the recess 40 will be described.

In a vertical cross section when viewed from the forward or rearward direction Fr of the vehicle, the recess 40 is recessed from the upper surface of the vehicle floor F. At a front side surface portion 41 of the recess 40, the opening ends 26, 26 defining the rear ends of the lower rails 20L, 20R are exposed, respectively.

Further, the length of the recess 40 along the forward or rearward direction Fr of the vehicle is larger than the width in the forward or rearward direction of the upper rails 10 provided on the seat 1. Thus, as shown in FIG. 6, when the seat 1 placed on the lower rails 20L is slid to the rear side, with the carriage 60 displaced in the vehicle width direction Wd from the rear end position of the lower rails 20L, the upper rails 10 move away from the rear ends of the lower rails 20L and onto the extensions thereof. As a result, the upper rails 10 are disengaged from the lower rails 20, and the seat 1 can be removed toward the upper side of the recess 40.

Referring back to FIG. 1, at a bottom surface portion 42 of the recess 40, vehicle width rails 50 extending straight along the vehicle width direction Wd are disposed. Here, the vehicle width rails 50 correspond to the conveyance path side rails of the present invention. The vehicle width rails 50 are constituted by a pair of rail members. More specifically, each rail member is formed to have a recessed configuration in a vertical cross sectional configuration. Further, the rail members are embedded into the bottom surface portion 42, and recessed openings 51 formed so as to extend in the longitudinal direction thereof are exposed at the bottom surface portion 42.

Next, the carriage 60 will be described.

The carriage 60 is accommodated within the recess 40, and is slidable in the vehicle width direction Wd so as to be movable between the rear end position of the lower rails 20L and the rear end position of the lower rails 20R. The length of the carriage 60 in the forward or rearward direction Fr of the vehicle is set to be slightly smaller than the length of the recess 40 in the forward or rearward direction Fr. With this configuration, the carriage 60 can slide in the vehicle width direction Wd without interfering with the front side surface portion 41 or the rear side surface portion (not shown) of the recess 40.

Here, FIG. 7 illustrates in detail the construction of the carriage 60. As shown in this figure, carriage rails 70 slidably engaging with the vehicle width rails 50 disposed at the recess 40 is positioned at the lower portion of the carriage 60. Here, the carriage rails 70 correspond to the movable member side rails of the present invention. The carriage rails 70 extend straight along the vehicle width direction Wd, and are constituted by a pair of rail members in correspondence with the vehicle width rails 50. More specifically, the rail members are each formed to have configuration like a projection in a vertical cross section for engaging with the recessed configurations of the vehicle width rails 50, and the rail members are assembled such that the two rail members hold from both sides the inner side surface portions of the rail members of the vehicle width rails 50. With this structure, the carriage 60 can slide within the recess 40 in the vehicle width direction Wd along the rail path formed through engagement of the carriage rails 70 and the vehicle width rails 50. That is, the sliding of the carriage 60 in the vehicle width direction Wd can be effected smoothly without any rattling through this rail engagement structure. Further, on the lower portions of the carriage rails 70, wheels 71 are provided and adapted to roll on the vehicle width rails 50 as the carriage 60 slides in the vehicle width direction Wd. With this structure, the movement of the carriage 60 in the vehicle width direction Wd can be effected more smoothly.

Referring back to FIG. 1, at the upper surface portion 61 of the carriage 60, guide rails 80 having the same vertical cross sectional configurations as the lower rails 20L, 20R are disposed. Here, the guide rails 80 have a rail width in the forward or rearward direction extending straight in the forward or rearward direction Fr of the vehicle, and the guide rails 80 are integrally fixed to the carriage 60. The guide rails 80 are embedded into the upper surface portion 61 of the carriage 60, and recessed openings 81 formed so as to extend in their longitudinal directions are exposed at the upper surface portion 61. With this structure, the guide rails 80 are set at the same level as the lower rails 20L, 20R.

More specifically, the guide rails 80 are constituted by a pair of rails. Further, the rail members of the guide rails 80 are spaced by the same distance along the vehicle width direction Wd as that between the lower rails 20L, 20R so as to be parallel thereto. Thus, as shown in FIG. 2, when the carriage 60 is positioned to be aligned with the rear end position of the left-hand side lower rails 20L, the rail members of the guide rails 80 are respectively situated in the extensions of the rail members of the lower rails 20L. By moving the carriage 60 in the vehicle width direction Wd toward the rear end position of the right-hand side rails 20R, the guide rails 80 are transferred while being maintained in parallel to the lower rails 20L, 20R. Thus, as shown in FIG. 3, by positioning the carriage 60 to align with the rear end position of the right-hand side lower rails 20R, it is possible to position the rail members of the guide rails 80 at positions in the extensions of the rail members of the lower rails 20R.

Here, as shown in FIG. 7, the carriage 60 is provided with a lock device 90 capable of locking the sliding movement in the vehicle width direction Wd with respect to the recess 40. The lock device 90 has a bar-like lock member 91 provided on a side surface portion of the carriage rail 70 and an arm-like operating member 92 connected to the lock member 91.

More specifically, the lock member 91 is guided by the side surface portion of the carriage rail 70 so as to be capable of vertical movement. Further, the operating member 92 is linked to the bar-like lock member 91, and is pivotally supported at the side surface portion of the carriage rail 70 so as to be swingable. With this structure, the lock member 91 is operated to move vertically as the operating member 92 is operated to swing. Further, the operating member 92 is urged in the swinging direction in which the lock member 91 is downwardly moved by a tension spring 93 provided between itself and the side surface portion of the carriage rail 70.

Further, a lock hole 52$h$ into which the lock member 91 can be dropped is formed in the upper surface portion 52 of the vehicle width rail 50 on which the carriage rail 70 slides. One lock hole 52$h$ is formed at each of the left-hand and right-hand side ends in the vehicle width direction Wd of the vehicle width rail 50, making it possible for the lock member 91 to be dropped in when the carriage 60 is aligned with the rear end positions of the lower rails 20L, 20R.

Thus, during the sliding movement in the vehicle width direction Wd of the carriage 60, when there is no lock hole 52$h$ directly below the lock member 91, the lock member 91 is kept in contact with the surface of the upper surface portion 52 of the vehicle width rail 50 by the urging force of the tension spring 93. In this state, the carriage 60 can slide in the vehicle width direction Wd with respect to the recess 40. When, however, during the sliding movement of the carriage 60, the lock hole 52$h$ comes directly below the lock member 91, the lock member 91 is automatically dropped into the lock hole 52$h$ by the urging force of the tension spring 93. As a result, the carriage 60 is brought into a state in which the carriage 60 cannot slide in the vehicle width direction Wd with respect to the recess 40, and the carriage 60 is fixed and restrict with respect to the sliding motion.

The lock state due to the lock member 91 can be released by operating the operating member 92 to swing against the urging force of the tension spring 93. With this operation, the carriage 60 can be restored to the state in which the carriage 60 can slide in the vehicle width direction Wd with respect to the recess 40.

Thus, by sliding the carriage 60, for example, from the position of FIG. 1, to the left along the vehicle width direction Wd, the carriage 60 can be aligned with the rear end position of the left-hand side lower rails 20L, and can be automatically locked with respect to the sliding movement in this state. As a result, the guide rails 80 on the upper portion of the carriage 60 are kept aligned with the extensions of the lower rails 20L. Thus, by sliding rearward the seat 1 on the lower rails 20L in this state, the upper rails 10 of the seat 1 can be moved from the lower rails 20L to directly enter the guide rails 80 in the extensions thereof. As a result, as shown in FIG. 2, the upper rails 10 move onto the carriage 60 as it is guided by the guide rails 80, and are maintained in a state in which the upper rails 10 are situated in the extensions of the lower rails 20L.

Here, referring to FIG. 7, through-holes 82$h$ are formed in an inner surface portion 82 of each rail member of the guide rails 80. Like the aforementioned through-holes 24$h$ formed in the lower rails 20L, 20R, the through-holes 82$h$ are formed in pairs, allowing hooking-in of the lock claw 31 of the slide lock mechanism 30.

Thus, referring back to FIG. 2, by moving the seat 1 onto the carriage 60, the through-holes 12$h$ (see FIG. 10) formed in the upper rails 10 can be aligned with the through-holes 82$h$ (see FIG. 7) formed in the guide rails 80. As a result, the lock claw 31 of the slide lock mechanism 30 automatically enters the through-holes 12$h$, 82$h$ due to the urging force. As a result, the upper rails 10 are locked against the guide rails 80 with respect to the sliding movement along the forward or rearward direction Fr, and are locked and restricted at the slide position. That is, according to this construction, the slide lock mechanism 30, which is the lock mechanism against the lower rails 20L, 20R, is adopted as the guide lock mechanism for locking the sliding movement of the upper rails 10 against the guide rails 80.

Further, as shown in FIG. 8, the cover member 100 in the form of an elongated plate capable of closing the opening portion constituting the movement path for the carriage 60 can be detachably fitted into the recess 40. For example, the cover member 100 may be formed to have such a size that, by placing the cover member 100 in a state in which the carriage 60 has been moved to the rear end position of the lower rails 20L on the left-hand side, the cover member 100 can close the opening portion of the recess 40, which is open on the right-hand side. Further, although not shown, by placing the cover member 100 in a state in which the carriage 60 has moved to the rear end position of the lower rails 20R on the right-hand side, it is possible to close the opening portion of the recess 40, which is open on the left-hand side. As shown in FIG. 8, the cover member 100 is formed such that, in the state in which the cover member 100 has been placed at the recess 40, the upper surface thereof is flush with the upper surface of the vehicle floor F. Thus, due to the installation of the cover member 100, it is possible to cover the opening portion of the recess 40 so as to improve the external appearance thereof. Further, it is possible to restrict the movement of the carriage 60 in the vehicle width direction Wd. Further, it is possible to restrict the sliding movement so as to prevent the seat 1 (not shown) on the lower rails 20R on the right-hand side, where the cover member 100 is fitted, from being accidentally moved into the recess 40.

Referring back to FIG. 1, by operating an operating lever 0 provided on the back side of the seat 1, a seat cushion 2 constituting a seating portion can be raised to be pivoted toward a seat back 3 constituting a backrest portion, so that the seat 1 can be switched to a tip-up attitude condition.

Thus, by keeping the seat 1 in the tip-up attitude condition, the seat 1 can be moved in the forward or rearward direction Fr or the vehicle width direction Wd in a compact attitude condition. Further, as shown in FIG. 5, also when bringing the seats 1 together on the lower rails 20R on one side to arrange them in the forward or rearward direction Fr, the seats 1 can be brought together in a compact manner in the forward or rearward direction Fr by keeping them in the tip-up attitude condition.

Here, as shown in the same figure, the right-hand side lower rails 20R are long enough to allow all the movable seats 1b positioned on the right-hand side and the left-hand side to be arranged in the forward or rearward direction Fr. The vehicle shown in the drawing is a six-passenger vehicle in which six seats 1a through 1f are arranged. Normally, three seats 1d through 1f of the six seats are arranged on the lower rails 20L on the left-hand side. Other two seats 1b, 1c are arranged on the lower rails 20R on the right-hand side. The remaining one seat 1a is the driver's seat, which is not arranged on the right-hand side lower rails 20R. That is, the right-hand side lower rails 20R are arranged to extend in the forward or rearward direction Fr from a position near the rear end of the vehicle floor F to a position directly behind the driver's seat.

The lower rails 20L, 20R are arranged so as to extend forwards from positions adjacent to the rear end of the vehicle, and the recess 40 is provided so as to connect the rear end positions. Thus, it is possible, for example, to perform the operation for moving the carriage 60 positioned at the recess 40 while standing on the side of the vehicle rear door, thus facilitating the operation.

Next, a method of using this embodiment will be described. Here, by way of example, described herein is a method of moving the seat 1, which is placed on the lower rails 20L on the left-hand side of the vehicle floor F, along the vehicle width direction Wd and transferring the seat 1 onto the lower rails 20R on the right-hand side.

For example, if the state shown in FIG. 1 is regarded as the initial state, the carriage 60 in this state is positioned at the center with respect to the vehicle width direction Wd of the recess 40. Thus, first, the carriage 60 is slid to the left. As a result, the sliding movement of the carriage 60 is locked, with the carriage 60 being aligned with the rear end position of the left-hand side lower rails 20L. As a result, the guide rails 80 on the upper surface portion 61 of the carriage 60 are maintained in a state in which the guide rails 80 are positioned in the extensions of the lower rails 20L.

Thus, next, the releasing lever C of the seat 1 is operated to release the slide lock state against the left-hand side lower rails 20L. Then, the seat 1 is slid to the rear side. As a result, the upper rails 10 of the seat 1 are displaced from the lower rails 20 onto the extensions thereof, and enter the guide rails 80 while being guided thereby. Then, the upper rails 10 are successively slid further into the guide rails 80, so that the sliding movement of the upper rails 10 is locked at a position on the guide rails 80. As a result, as shown in FIG. 2, the seat 1 is maintained in a state in which the seat 1 is placed on the carriage 60. More specifically, the upper rails 10 are maintained in a state in which the upper rails 10 are situated in the extensions of the lower rails 20L.

Next, with the seat 1 placed thereon as described above, the carriage 60 is moved to the right along the vehicle width direction Wd, so that, as shown in FIG. 3, its sliding movement is locked while being aligned with the rear end position of the right-hand side lower rails 20R. As a result, the guide rails 80 installed on the carriage 60 are maintained in a state in which the guide rails 80 are arranged at positions in the extensions of the right-hand side lower rails 20R.

Thus, next, as shown in FIG. 4, the seat 1 placed on the carriage 60 is slid forwards toward the destination lower rails 20R while being guided by the guide rails 80, so that the sliding movement of the upper rails 10 is accepted as it is by the destination lower rails 20R. As a result, the upper rails 10 are slidably engaged with the destination lower rails 20R.

Further, in this way, the seats 1d through 1f on the left-hand side lower rails 20L are sequentially transferred onto the right-hand side lower rails 20R, so that, as shown in FIG. 5, it is possible to bring the seats 1b through 1f together on the right-hand side lower rails 20R. As a result, it is possible to secure a large cabin space on the side of the vehicle floor F where the lower rails 20L are arranged.

The operation method for transferring the seat 1 from the right-hand side lower rails 20R to the left-hand side lower rails 20L can be conducted in the same manner as described above, so a description thereof will be omitted.

In this way, according to the movement device for the vehicle seat of this embodiment, the engagement structure of the seat 1 with the vehicle floor F is realized by an engaging structure between rails constituted by the upper rails 10 and the lower rails 20L, 20R, and there is provided the carriage 60 which enables the seat 1 to be separated from the vehicle floor F and to move along the vehicle width direction wd between the lower rails 20L, 20R, so that the engagement structure for the seat 1 with the vehicle floor F can be realized in a relatively simple construction allowing easy securing of a support strength large enough to withstand a relatively large load as involved at the time of vehicle collision or the like. Further, due to the provision of the guide rails 80 on the carriage 60, it is possible to maintain the same attitude condition of the seat 1 with respect to the carriage 60 as that resulted when the sliding movement of the upper rails 10 has been taken from the lower rails 20L, 20R. As a result, it is possible to transfer the seat 1 to the carriage 60 and to the destination of the lower rails 20R (20L) by moving the seat 1 solely in the forward or rearward direction Fr.

Further, the lower rails 20L, 20R and the guide rails 80 have the same vertical cross sectional structure, so that the upper rails 10 can have the same engagement structure to achieve rationalization of a component design.

Further, the slide lock mechanism 30 is provided on the structure of high support strength in which the upper rails 10 and the lower rails 20L, 20R are engaged with each other, so that it is possible to relatively easily provide a lock structure having a support strength large enough to withstand a relatively large load as involved at the time of vehicle collision or the like.

Further, the seat 1 that has been slid from the lower rails 20L, 20R onto the carriage 60 can be locked while it is carried, so that the movement of the seat 1 along the vehicle width direction Wd by the carriage 60 can be effected in a stable manner. Further, since the same structure as that of the slide lock mechanism 30 is applied to this lock mechanism, the same lock structure can be used to fix and restrict the upper rails 10, so that rationalization of a component design can be achieved.

Further, the engagement structure between rails has been applied to the structure for moving the carriage 60 along the vehicle width direction Wd, so that the movement of the carriage 60 along the vehicle width direction Wd can be effected smoothly and more appropriately.

Further, due to the provision of the lock device 90, it is possible to lock the movement of the carriage 60 along the vehicle width direction Wd whenever the seat 1 attains a position where the seat 1 can be moved to the destination lower rails 20R (20L). Thus, there is no need to perform the operation for positioning the carriage 60 with respect to the vehicle width direction Wd, so that the requisite operation can be simplified.

Further, the plurality of seats 1 positioned on the lower rails 20L (20R) on the other side can be moved to the lower rails 20R (20L) on one side so as to be arranged in line, so that a large cabin space can be secured on the other side. In particular, in this embodiment, all the movable seats 1b through 1f on the right-hand side and the left-hand side can be arranged in line on the lower rails 20R on one side, so that a larger cabin space can be secured on the other side.

Further, by arranging the seats 1 on the lower rails 20R (20L) on one side in the tip-up attitude, it is possible to bring the seats 1b through 1f compactly together with respect to the forward or rearward direction Fr.

Further, since the seat 1 is moved in the vehicle width direction Wd at the rear end side of the lower rails 20L, 20R, it is possible to effect the movement of the seat 1 in the vehicle width direction Wd from, for example, the vehicle rear door side. Further, since the carriage 60 is not allowed to enter the movement routes of the lower rails 20L, 20R, the sliding movement of the seat 1 in the forward or rearward direction Fr and the movement thereof in the vehicle width direction Wd can be easily effected in distinction from each other, so that an improvement in terms of operability can be achieved.

Further, since the carriage 60 is received within the recess 40 and moves therein, the movement structure for the carriage 60 can be constructed relatively simply while saving a space.

Further, since the opening portion of the recess 40 as the conveyance path can be closed by the cover member 100, it is possible to prevent the appearance of the vehicle interior from being impaired despite the formation of the recess 40. Further, since the cover member 100 and the carriage 60 disposed within the recess 40 are flush with the vehicle floor F, and not protruding from the upper surface of the vehicle floor F is suppressed, so that the appearance of the vehicle interior can be improved. Further, since the recess 40 is covered, it is possible to prevent the seat 1 on the lower rails 20R (20F) from being accidentally moved into the recess 40. Further, due to the installation of the cover member 100, it is possible to restrict the movement of the carriage 60 along the vehicle width direction Wd, so it is possible to prevent accidental operation of the carriage 60.

Embodiment 2

Next, a movement device for a vehicle seat according to Embodiment 2 will be described with reference to FIGS. 12 through 17. FIG. 12 is a schematic perspective view showing the construction of a movement device for a vehicle seat. FIG. 13 is an enlarged perspective view showing the construction of a slope 200. FIG. 14 is a perspective view showing a state in which the seat 1 is placed on the carriage 60. FIG. 15 is a perspective view showing a state in which the carriage 60 has been moved to a position where the slope 200 is installed. FIG. 16 is a perspective view showing a state in which the seat 1 has been unloaded from the vehicle floor F via the slope 200. FIG. 17 is a schematic view showing how the slope 200 is stored.

In this embodiment, the portions of substantially the same construction and operation as those of the movement device for the vehicle seat of Embodiment 1 are indicated by the same reference numerals, and a description thereof will be omitted.

As shown in FIG. 12, in this embodiment, the slope 200 capable of unloading the seat 1 from the vehicle floor F is provided at the rear of the recess 40 serving as the conveyance path. The slope 200 is configured by assembling into one piece an upper stage member 210 to be installed on the vehicle floor F, a lower stage member 220 to be installed on the ground, and an intermediate member 230 connecting the upper stage member and the lower stage member. FIG. 12 shows how the slope 200 is assembled, and FIG. 13 is an exploded view of the parts.

As shown in FIG. 12, the slope 200 is installed by fitting the upper stage member 210 into a recessed installation groove portion M formed directly behind the recess 40.

The installation recess 40 is formed directly behind a position substantially at the center with respect to the vehicle width direction Wd of the recess 40 so as to be continuous with the recess 40. p Here, as shown in FIG. 13, the upper stage member 210, the lower stage member 220, and the intermediate member 230 have pairs of upwardly open rail grooves 211, 221, 231, respectively, extending in the longitudinal direction thereof. The rail grooves 211, 221, 231 are formed as pairs of right-hand and left-hand grooves; through assembly of the members, the rail grooves are connected so as to be continuous with each other, so that rail grooves 201 are formed.

As shown in FIG. 12, the rail grooves 201, formed as continuous grooves, are arranged at an interval along the vehicle width direction Wd that is the same as the interval between the rail members of the guide rails 80. Thus, as shown in this figure, by moving the carriage 60 in the vehicle width direction Wd to align the carriage 60 where the slope 200 is installed, it is possible to arrange the rail members of the guide rails 80 at positions in the extensions of the rail grooves 201 of the slope 200. In this embodiment, the lock hole 52h (see FIG. 7 showing Embodiment 1) capable of locking the sliding movement along the vehicle width direction Wd of the carriage 60 is also provided at the central position of the vehicle guide rails 50; by sliding the carriage 60 to the position where the carriage 60 is aligned with the slope 200, the sliding movement is locked. As a result, the guide rails 80 provided on the carriage 60 are maintained in a state in which the guide rails 80 are arranged at positions in the extensions of the rail grooves 201 of the slope 200.

Thus, in order to unload the seat 1, which is placed on the lower rails 20L on the left-hand side of the vehicle floor F, onto the ground, the following procedures are executed.

First, as shown in FIG. 14, in the state that the carriage 60 is aligned with the rear end position of the left-hand side lower rails 20L, the seat 1 is slid onto the carriage 60, and this placed thereon. In this state, as shown in FIG. 15, the carriage 60 is slid to the central position where the slope 200 is installed, and the sliding movement thereof is locked. Further, the releasing lever C is operated to release the lock state between the seat 1 and the carriage 60, and the seat 1 is slid on the slope 200 along the rail grooves 201 of the slope 200. As a result, as shown in FIG. 16, the seat 1 can be unloaded from the vehicle floor F onto the ground.

By the way, as shown in FIG. 17, by disassembling the slope 200, the slope 200 can be compactly stored within the opening portion of the recess 40. More specifically, the intermediate member 230 of the slope 200 is formed as an elongated plate capable of closing the opening portion of the recess 40. Here, the intermediate member 230 corresponds to the cover member of the present invention. The upper stage member 210 and the lower stage member 220 are formed to have sizes enabling these members to be stored in the opening portion of the recess 40. Thus, by installing the intermediate member 230 serving as the cover member in the state where the upper stage member 210 and the lower stage member 220 are stored within the opening portion of the recess 40, it is possible to close the opening portion of the recess 40 while keeping a satisfactory outward appearance.

In this way, since the slope 200 can be installed in relation to the sliding movement of the carriage 60, the seat 1 can be unloaded not from the position in the extensions of the lower rails 20L, 20R but from the central position in the vehicle width direction Wd along the slope 200. That is, the seat 1, which would interfere with a side wall portion of the vehicle body when unloaded from a position in the extensions of the lower rails 20L, 20R, can be allowed to be unloaded after being moved to the central position in the vehicle width direction Wd, where no interference is caused. Further, since the slope 200 is provided with the rail grooves 201 along which the upper rails 10 of the seat 1 can be slid, it is possible for the seat 1 to be unloaded straight along the rail grooves 201, which is advantageous from the viewpoint of safety.

Further, when the slope 200 is not used, the slope 200 can be advantageously disassembled and stored within the open space in the recess 40. Further, due to the intermediate member 230 constituting the slope 200, it is possible to cover the upper stage member 210 and the lower stage member 220 so as to make them invisible from the outside, thus it is possible to store the slope 200 while keeping a satisfactory outward appearance.

Although embodiments of the present invention have been described based on two embodiments, the present invention can be carried out in various other modes.

For example, as shown in FIG. 18, the movement path (recess 40) for moving the seat 1 along the vehicle width direction Wd may be formed at the front end position of the lower rails 20L, 20R or at a midpoint along the forward or rearward direction Fr thereof. It should be noted that, in this case, when providing the slope 200 of Embodiment 2, which enables the seat 1 to be unloaded, and connecting the slope 200 with the recess 40 provided at the front end or at a midpoint, the requisite length of the slope 200 shall be increased.

Further, as shown in FIG. 19, it is also possible to provide a plurality of (e.g., four to six) rail members of the lower rails 20 on the vehicle floor F at equal intervals along the vehicle width direction Wd, with the seat 1 being slidably engaged with any pair of adjacent rail members of the lower rails 20.

Further, as shown in FIGS. 20 and 21, the recess 40 may also be configured so as to be staggered stepwise along the forward or rearward direction Fr at a midpoint in the movement path along the vehicle width direction Wd. This makes it possible, for example, to configure the recess 40 so as to avoid any obstacle on the vehicle floor F.

In this case, however, as indicated by the phantom lines in the drawings, it is necessary to move the carriage 60 while shifting the carriage 60 stepwise along the vehicle width direction Wd and the forward or rearward direction Fr in conformity with the configuration of the recess 40. Further, as shown in FIG. 22, it is also possible to form the recess 40 obliquely with respect to the vehicle width direction Wd.

Further, as shown in FIG. 23, it is also possible to provide wheels 71 directly on the lower portion of the carriage 60, so that the carriage 60 can be guided in its movement in the vehicle width direction Wd through rolling of the wheels 71.

Further, as shown in FIG. 24, a plurality of pins P may be provided upright on the upper surface portion of the carriage 60, so that the sliding movement of the upper rails 10 of the seat can be guided by the pins P. The pins P may be arranged so as to guide the outer side portions of the upper rails 10 as shown in the same figure, or so as to guide the inner side portions thereof. It is also possible to guide solely one rail member from the outer and inner sides thereof. This technical idea is also applicable to the construction of the guide rails 80 of the above embodiments; it is also possible to guide one rail member of the upper rails 10 by a single rail member. Further, as shown in the same figure, it is also possible to restrict rearward sliding movement of the upper rails 10 on the carriage 60 by means of pins P.

Further, although not shown in the drawings, the guide members such as the lower rails or the guide rails may protrude from the vehicle floor. In the case that the lower rails protrude from the vehicle floor, no recess may be provided, so that the carriage can directly move on the vehicle floor along the vehicle width direction Wd.

Further, it is not necessary to provide the rail structure along the vehicle width direction Wd between the carriage and the recess; it is also possible that the lower surface of the carriage slides on the recess.

Further, it is not necessary to provide the lock device for locking the sliding movement of the carriage along the vehicle width direction Wd, or the lock device for locking the sliding movement along the forward or rearward direction Fr of the seat on the carriage. While in the above embodiments the slide lock mechanism 30 is adopted as the latter lock device, it is also possible to adopt the construction of the lock device 90. This helps to make the construction itself simpler. However, in the construction in which the slide lock mechanism 30 is provided, separately providing the lock device 90 may result in increase in the number of components and in a rather complicated construction.

Further, it is not always necessary for the lower rails to be long enough to enable to bring all the movable seats on the right-hand and left-hand sides together. It is also possible for solely the lower rails on one of the right-hand and left-hand sides to have such a length as mentioned above.

Further, it is not necessary for the seats to be brought together in the tip-up attitude.

Further, it is not necessary to provide the cover member for closing the recess. While in the construction of Embodiment 2 the slope 200 is stored while being divided into three, it is also possible, for example, for the slope to be foldable or to allow storing compactly through sliding.

Further, the slope may be connected together in the extension of the rear end position of the lower rails.

The invention claimed is:

1. A movement device for a vehicle seat, comprising:
a plurality of rows of lower rails disposed on a vehicle floor and extending at least in a forward or rearward direction of a vehicle in order to move the seat and arranged in a vehicle width direction;
an upper rail provided on the seat and slidably movably engaged with the lower rails;
a guide rail provided in an extension of the lower rail so as to be capable of directly accepting a sliding movement of the upper rail of the seat from the lower rail, as the upper rail is removed from the lower rail into the extension thereof, the upper rail sliding along the forward or rearward direction of the vehicle on the lower rail;
a movable member on which the guide rail is placed and which is movable in the vehicle width direction while being separated from the floor; and
a conveyance path allowing the movable member to be conveyed along the vehicle width direction between the plurality of rows of lower rails.

2. A movement device for a vehicle seat according to claim 1, wherein the lower rails and the guide rail are of the same vertical cross sectional structure.

3. A movement device for a vehicle seat according to claims 1, wherein the seat is provided with a slide lock mechanism capable of fixing and restricting a position of the upper rail with respect to the lower rails.

4. A movement device for a vehicle seat according to claim 1, wherein a guide lock mechanism capable of fixing and restricting a position of the seat with respect to the movable member is provided between the seat placed on the movable member and the movable member.

5. A movement device for a vehicle seat according to claim 4, wherein the guide lock mechanism is constructed to fix the position of the seat by fixing and restricting the position of the upper rail with respect to the guide rails, and the slide lock mechanism is provided on the seat for fixing and restricting the position of the upper rail with respect to the lower rails.

6. A movement device for a vehicle seat according to claim 1, wherein the conveyance path is equipped with a conveyance path side rail extending along the vehicle width direction, and a movable member side rail fixedly installed on the movable member is slidably engaged with the conveyance path side rail.

7. A movement device for a vehicle seat according to claim 1, wherein a lock device capable of restricting the position along the vehicle width direction of the movable member with respect to the conveyance path is provided between the movable member and the conveyance path, and
the lock device is placed in a lock state whenever at least the upper rail of the seat placed on the movable member is at a position in the extension of the lower rail.

8. A movement device for a vehicle seat according to claim 1,
wherein the lower rails are arranged on right-hand side and left-hand side of the vehicle floor in two rows along the vehicle width direction, and
wherein the lower rails on at least one side are long enough to allow two or more seats to be arranged along the forward or rearward direction of the vehicle and to be placed thereon by moving the seats placed on the lower rails on the other side.

9. A movement device for a vehicle seat according to claim 8, wherein the lower rails on at least one side are long enough to allow all the movable seats on the right-hand and left-hand sides to be arranged along the vehicle longitudinal direction and placed thereon.

10. A movement device for a vehicle seat according to claim 8, wherein the seats arranged along the forward or rearward direction and placed on at least on the lower rails on one side are positioned in a tip-up attitude in which seat cushions constituting seating portions are raised and rotated toward seat backs constituting backrest portions.

11. A movement device for a vehicle seat according to claim 1, wherein the conveyance path in the vehicle width direction is disposed at a rear end of the lower rails.

12. A movement device for a vehicle seat according to claim 1,
wherein the conveyance path in the vehicle width direction is formed as a recess extending in the vehicle width direction and recessed with respect to the vehicle floor surface in a vertical cross section as seen in the forward or rearward direction of the vehicle, and the length of the recess in the forward or rearward direction of the vehicle is the length allowing storage of the movable member.

13. A movement device for a vehicle seat according to claim 12,
wherein an upper surface of the movable member movably received and installed in the recess serving as the conveyance path is set to be the same level as the vehicle floor,
wherein a cover member is detachably fitted into the recess serving as the conveyance path and is capable of closing an opening portion of the recess where the movable member is installed, and
wherein an upper surface of the cover member is at the same level as the vehicle floor in a state in which the cover member is fitted into the opening portion of the recess.

14. A movement device for a vehicle seat according to claim 13, wherein the cover member constitutes a stopper restricting the movement of the movable member in the vehicle width direction in the state in which the cover member is fitted into the opening portion of the recess.

15. A movement device for a vehicle seat, comprising:
a plurality of rows of lower rails disposed on a vehicle floor and extending at least in a forward or rearward direction of a vehicle in order to move the seat and arranged in a vehicle width direction;
an upper rail provided on the seat and slidably movably engaged with the lower rails;
a guide member guiding the upper rail while maintaining a height and vertical and horizontal angles thereof with respect to the lower rail when the upper rail of the seat sliding on the lower rail along the forward or rearward direction of the vehicle is removed from the lower rail into an extension thereof,
a movable member on which the guide rail is placed and which is movable in the vehicle width direction while being separated from the floor; and
a conveyance path allowing the movable member to be conveyed along the vehicle width direction between the plurality of rows of lower rails.

16. A movement device for a vehicle seat according to claim 15, wherein the guide member comprises a guide rail provided in an extension of the lower rail so as to be capable of directly receiving the sliding movement of the upper rail from the lower rail.

17. A movement device for a vehicle seat according to claim 15, wherein the lower rails and the guide rail are of the same vertical cross sectional structure.

18. A movement device for a vehicle seat according to claim 15, wherein the seat is provided with a slide lock mechanism capable of fixing and restricting a position of the upper rail with respect to the lower rails.

19. A movement device for a vehicle seat according to claim 15, wherein a guide lock mechanism capable of fixing and restricting a position of the seat with respect to the movable member is provided between the seat placed on the movable member and the movable member.

20. A movement device for a vehicle seat according to claim 19, wherein the guide lock mechanism is constructed to fix the position of the seat by fixing and restricting the position of the upper rail with respect to the guide rails, and the slide lock mechanism is provided on the seat for fixing and restricting the position of the upper rail with respect to the lower rails.

21. A movement device for a vehicle seat according to claim 15, wherein the conveyance path is equipped with a conveyance path side rail extending along the vehicle width direction, and a movable member side rail fixedly installed on the movable member is slidably engaged with the conveyance path side rail.

22. A movement device for a vehicle seat according to claim 15, wherein a lock device capable of restricting the position along the vehicle width direction of the movable member with respect to the conveyance path is provided between the movable member and the conveyance path, and
the lock device is placed in a lock state whenever at least the upper rail of the seat placed on the movable member is at a position in the extension of the lower rail.

23. A movement device for a vehicle seat according to claim 15,
wherein the lower rails are arranged on right-hand side and left-hand side of the vehicle floor in two rows along the vehicle width direction, and
wherein the lower rails on at least one side are long enough to allow two or more seats to be arranged along the forward or rearward direction of the vehicle and to be placed thereon by moving the seats placed on the lower rails on the other side.

24. A movement device for a vehicle seat according to claim 23, wherein the lower rails on at least one side are long enough to allow all the movable seats on the right-hand and left-hand sides to be arranged along the vehicle longitudinal direction and placed thereon.

25. A movement device for a vehicle seat according to claim 23, wherein the seats arranged along the forward or rearward direction and placed on at least on the lower rails on one side are positioned in a tip-up attitude in which seat cushions constituting seating portions are raised and rotated toward seat backs constituting backrest portions.

26. A movement device for a vehicle seat according to claim 15, wherein the conveyance path in the vehicle width direction is disposed at a rear end of the lower rails.

27. A movement device for a vehicle seat according to claim 15,
wherein the conveyance path in the vehicle width direction is formed as a recess extending in the vehicle width direction and recessed with respect to the vehicle floor surface in a vertical cross section as seen in the forward or rearward direction of the vehicle, and the length of the recess in the forward or rearward direction of the vehicle is the length allowing storage of the movable member.

28. A movement device for a vehicle seat according to claim 27,
wherein an upper surface of the movable member movably received and installed in the recess serving as the conveyance path is set to be the same level as the vehicle floor,
wherein a cover member is detachably fitted into the recess serving as the conveyance path and is capable of closing an opening portion of the recess where the movable member is installed, and
wherein an upper surface of the cover member is at the same level as the vehicle floor in a state in which the cover member is fitted into the opening portion of the recess.

29. A movement device for a vehicle seat according to claim 28, wherein the cover member constitutes a stopper restricting the movement of the movable member in the vehicle width direction in the state in which the cover member is fitted into the opening portion of the recess.

* * * * *